US009836411B2

(12) United States Patent
Gschwind

(10) Patent No.: US 9,836,411 B2
(45) Date of Patent: Dec. 5, 2017

(54) SYNCHRONIZING UPDATES OF PAGE TABLE STATUS INDICATORS AND PERFORMING BULK OPERATIONS

(71) Applicant: INTERNATIONAL BUSINESS MACHINES CORPORATION, Armonk, NY (US)

(72) Inventor: Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/196,093

(22) Filed: Jun. 29, 2016

(65) Prior Publication Data

US 2016/0306747 A1    Oct. 20, 2016

Related U.S. Application Data

(63) Continuation of application No. 14/481,403, filed on Sep. 9, 2014, now Pat. No. 9,390,014, which is a (Continued)

(51) Int. Cl.
*G06F 12/08*    (2016.01)
*G06F 12/10*    (2016.01)
(Continued)

(52) U.S. Cl.
CPC .......... *G06F 12/1045* (2013.01); *G06F 3/065* (2013.01); *G06F 3/0611* (2013.01); *G06F 3/0619* (2013.01); *G06F 3/0644* (2013.01); *G06F 3/0656* (2013.01); *G06F 3/0664* (2013.01); *G06F 3/0673* (2013.01); *G06F 9/3851* (2013.01); *G06F 12/084* (2013.01); *G06F 12/0808* (2013.01);
(Continued)

(58) Field of Classification Search
None
See application file for complete search history.

(56) References Cited

U.S. PATENT DOCUMENTS 5,197,139 A    3/1993    Emma
5,758,120 A    5/1998    Kahle et al.
(Continued)

OTHER PUBLICATIONS

"Power PC® Microprocessor Family: The Programming Environments Manual for 32 and 64-bit Microprocessors," Version 2.3, Mar. 2005, pp. 1-722.
(Continued)

*Primary Examiner* — Kaushikkumar Patel
(74) *Attorney, Agent, or Firm* — Heslin Rothenberg Farley & Mesiti P.C.

(57) ABSTRACT

A synchronization capability to synchronize updates to page tables by forcing updates in cached entries to be made visible in memory (i.e., in in-memory page table entries). A synchronization instruction is used that ensures after the instruction has completed that updates to the cached entries that occurred prior to the synchronization instruction are made visible in memory. Synchronization may be used to facilitate memory management operations, such as bulk operations used to change a large section of memory to read-only, operations to manage a free list of memory pages, and/or operations associated with terminating processes.

19 Claims, 18 Drawing Sheets

Related U.S. Application Data continuation of application No. 14/292,656, filed on May 30, 2014, now Pat. No. 9,384,133.

(51) Int. Cl.

| | | |
|---|---|---|
| *G06F 12/1045* | (2016.01) | |
| *G06F 3/06* | (2006.01) | |
| *G06F 12/0882* | (2016.01) | |
| *G06F 12/0831* | (2016.01) | |
| *G06F 12/128* | (2016.01) | |
| *G06F 12/1009* | (2016.01) | |
| *G06F 12/0842* | (2016.01) | |
| *G06F 9/38* | (2006.01) | |
| *G06F 12/0808* | (2016.01) | |
| *G06F 12/084* | (2016.01) | |
| *G06F 12/0875* | (2016.01) | |

(52) U.S. Cl.
CPC ...... *G06F 12/0833* (2013.01); *G06F 12/0842* (2013.01); *G06F 12/0875* (2013.01); *G06F 12/0882* (2013.01); *G06F 12/1009* (2013.01); *G06F 12/128* (2013.01); *G06F 2212/1008* (2013.01); *G06F 2212/152* (2013.01); *G06F 2212/452* (2013.01); *G06F 2212/608* (2013.01); *G06F 2212/62* (2013.01); *G06F 2212/657* (2013.01); *G06F 2212/682* (2013.01); *G06F 2212/683* (2013.01); *G06F 2212/69* (2013.01)

(56) References Cited

U.S. PATENT DOCUMENTS

| | | | |
|---|---|---|---|
| 6,119,204 A * | 9/2000 | Chang | ................ G06F 12/1027 711/141 |
| 6,286,092 B1 | 9/2001 | Frank | |
| 6,647,468 B1 | 11/2003 | Woodward | |
| 6,880,045 B2 | 4/2005 | Pong et al. | |
| 7,069,361 B2 | 6/2006 | Owen et al. | |
| 7,096,323 B1 | 8/2006 | Conway et al. | |
| 7,549,035 B1 | 6/2009 | Cameron et al. | |
| 7,552,254 B1 | 6/2009 | George et al. | |
| 8,296,520 B2 | 10/2012 | Le et al. | |
| 8,307,194 B1 | 11/2012 | Scott et al. | |
| 8,341,379 B2 | 12/2012 | Pan et al. | |
| 2007/0061548 A1* | 3/2007 | Jordan | ................ G06F 12/1027 711/207 |
| 2007/0106874 A1* | 5/2007 | Pan | ................ G06F 12/10 711/206 |
| 2010/0332786 A1* | 12/2010 | Grohoski | ................ G06F 9/3851 711/207 |
| 2011/0307653 A1 | 12/2011 | Rudelic et al. | |
| 2012/0203984 A1 | 8/2012 | Woffinden | |
| 2013/0013863 A1 | 1/2013 | Cher et al. | |
| 2013/0046937 A1 | 2/2013 | Heller, Jr. | |
| 2013/0212313 A1 | 8/2013 | Cota-Robles et al. | |
| 2015/0247301 A1 | 12/2015 | Gschwind | |
| 2015/0347044 A1 | 12/2015 | Gschwind | |
| 2015/0347300 A1 | 12/2015 | Gschwind | |
| 2015/0347306 A1 | 12/2015 | Gschwind | |

OTHER PUBLICATIONS

"z/Architecture—Principles of Operation," IBM Publication No. SA22-7832-09, 10th Edition, Sep. 2012, pp. 1-1568.

Power ISA™ Version 2.07 specification, May 3, 2013, pp. 1-1526.

Intel Itanium Architecture Software Developer's Manual vol. 2: System Architecture, Document No. 245318, May 2010, pp. 1-676.

Office Action for U.S. Appl. No. 14/481,244, dated Nov. 4, 2015, pp. 1-25.

Office Action for U.S. Appl. No. 14/292,604, dated Nov. 5, 2015, pp. 1-31.

Office Action for U.S. Appl. No. 14/292,656, dated Dec. 17, 2015, pp. 1-14.

Office Action for U.S. Appl. No. 14/481,403, dated Dec. 17, 2015, pp. 1-13.

List of IBM Patents or Patent Applications Treated As Related, Jun. 29, 2016, 2 pages.

* cited by examiner

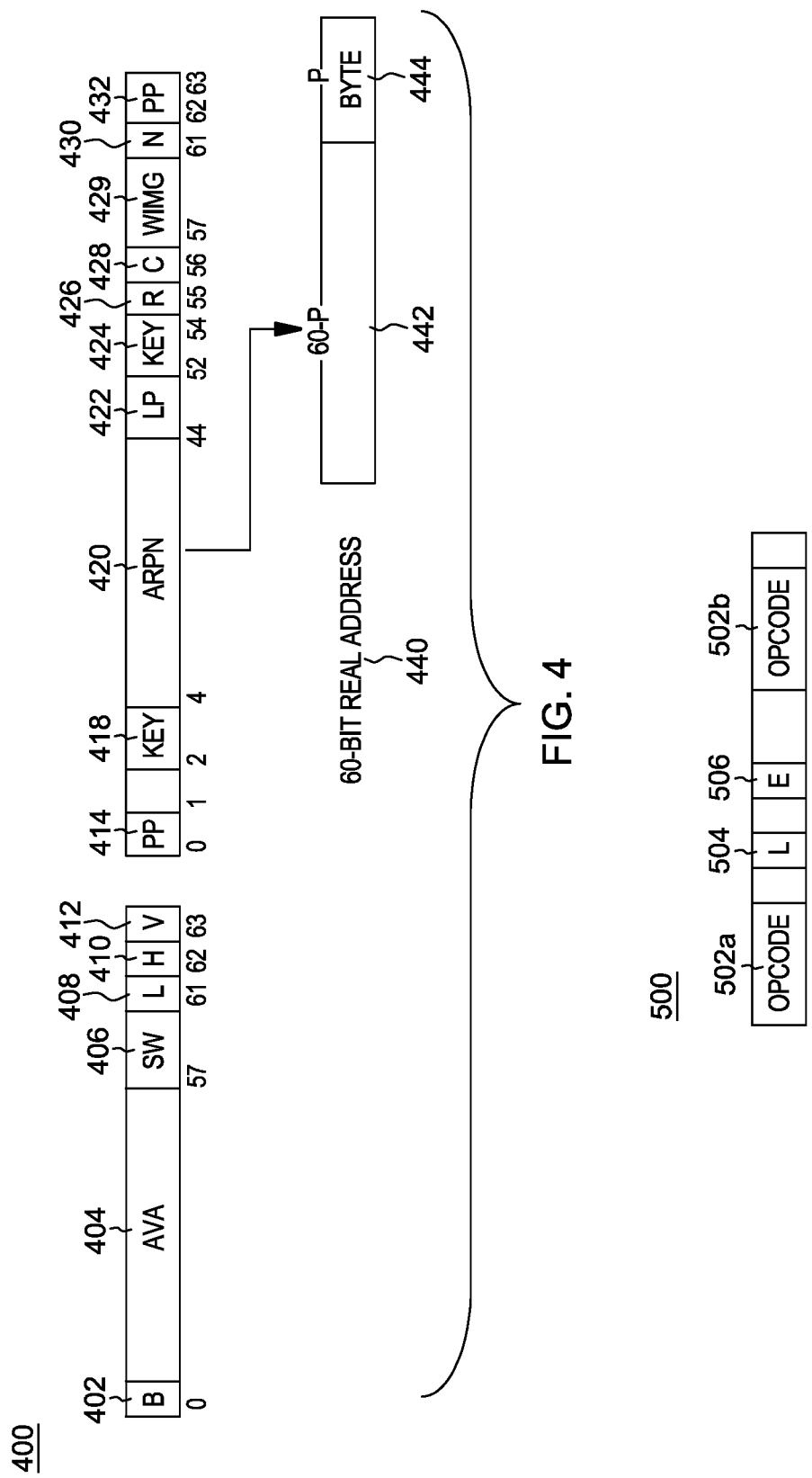

SYNCHRONIZING UPDATES OF PAGE TABLE STATUS INDICATORS AND PERFORMING BULK OPERATIONS

CROSS-REFERENCE TO RELATED APPLICATIONS

This application is a continuation of co-pending U.S. patent application Ser. No. 14/481,403, filed Sep. 9, 2014, which is a continuation of U.S. patent application Ser. No. 14/292,656, filed May 30, 2014, entitled "SYNCHRONIZING UPDATES OF PAGE TABLE STATUS INDICATORS AND PERFORMING BULK OPERATIONS," each of which is hereby incorporated herein by reference in its entirety.

BACKGROUND

One or more aspects relate, in general, to processing within a multiprocessor computing environment, and in particular to, synchronizing updates of status indicators in page tables used by the multiprocessor computing environment.

Page tables are data structures used to store the mapping between virtual addresses and physical addresses. Virtual addresses are associated with virtual memory, which is used to provide the appearance of additional physical memory. As is known, physical memory is of a defined size and in order to have the physical memory appear larger than it is, virtual memory is utilized. The virtual memory is mapped to physical memory, and techniques are provided to use the virtual addresses to locate page table entries, which include the physical addresses used to access physical memory.

Each page table entry includes status indicators used in managing the entry and/or page of memory associated with the entry. Further, to optimize performance, cached copies of the page table entries are maintained in caches, such as translation lookaside buffers (TLBs). Thus, when a page table entry is revised, the cached copy is to be updated or invalidated, and when the cached copy is updated, the updates are to be reflected in the page table.

SUMMARY

Shortcomings of the prior art are overcome and advantages are provided through the provision of a computer program product for performing operations in a computing environment. The computer program product includes a computer readable storage medium readable by a processing circuit and storing instructions for execution by the processing circuit for performing a method. The method includes initiating, by a processor of the computing environment, a synchronization operation to instruct one or more other processors of the computing environment to commit pending updates of one or more status indicators of one or more entries of an address translation structure located in memory; receiving, by the processor, a completion indication by the one or more other processors indicating completion of the synchronization operation; invalidating, by the processor, based on receipt of the completion indication from the one or more other processors, one or more selected entries of one or more local caches, the one or more selected entries having at least one status indicator that has been updated; and performing an operation using one or more entries of the address translation structure.

Computer-implemented methods and systems relating to one or more embodiments are also described and may be claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

FIG. 4 depicts one example of a page table entry;

FIG. 5 depicts one implementation of a synchronization instruction;

DETAILED DESCRIPTION

In accordance with one or more aspects, a synchronization capability is provided to synchronize updates to page tables by forcing pending updates in cached entries to be made visible in memory (i.e., in in-memory page table entries). As one example, a synchronization instruction is used that ensures after the instruction has completed that updates to the cached entries that occurred prior to the synchronization instruction are made visible in memory. In the particular example herein, the synchronization instruction is referred to as an RCsync instruction, since it is synchronizing updates of the reference (R) and change (C) indicators of page tables. However, in other embodiments, other updates to status indicators of page tables may be synchronized using the same instruction or a different instruction.

In one embodiment, synchronization is used to facilitate memory management operations, such as bulk operations used to change a large section of memory to read-only, operations to manage a free list of memory pages, and/or operations associated with terminating processes.

Computing environments of different architectures may incorporate and use one or more aspects of the synchronization capability provided herein. For instance, environments based on the PowerPC architecture, also referred to as Power ISA, offered by International Business Machines Corporation (IBM®) and described in Power ISA™ Version 2.07, May 3, 2013, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7832-09, 10th Edition, September 2012, which is hereby incorporated by reference herein in its entirety.

POWER, POWER ARCHITECTURE, POWERPC, Z/ARCHITECTURE, IBM, AIX, POWERVM, Z/OS and Z/VM (referenced herein) are registered trademarks of International Business Machines Corporation, Armonk, N.Y. Other names used herein may be registered trademarks, trademarks or product names of International Business Machines Corporation or other companies.

Figure 1:
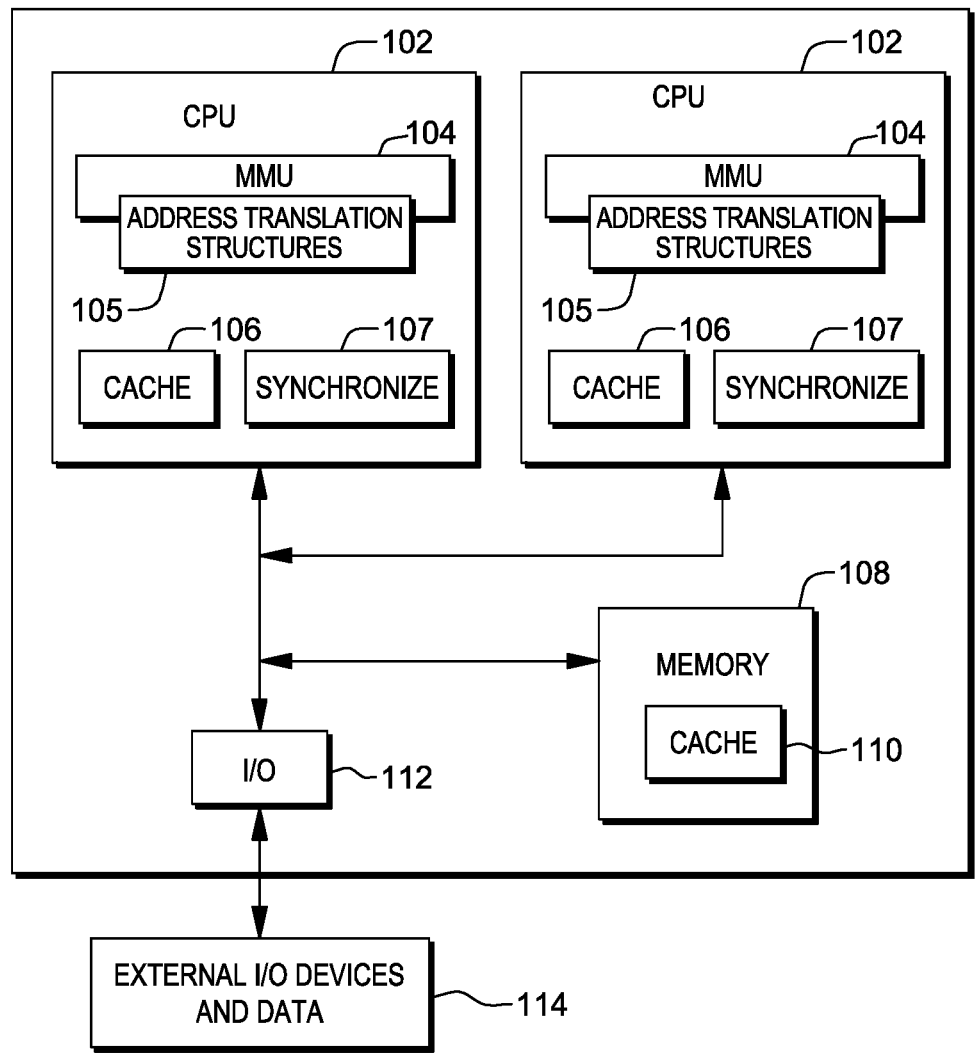
FIG. 1 depicts one example of a computing environment to incorporate and use one or more aspects of a synchronization capability.

One example of a computing environment to incorporate and use one or more aspects of a synchronization capability is described with reference to FIG. 1. In one example, a computing environment 100 includes a plurality of processors (central processing unit—CPU) 102, and each processor includes, for instance, at least one memory management unit (MMU) 104, one or more address translation structures 105, one or more caches 106, and a synchronization unit 107 to provide the synchronization capability described herein.

Each processor 102 is communicatively coupled to a memory portion 108 (either the same portion or a different portion) having one or more caches 110, and to an input/output (I/O) subsystem 112 (again, either the same subsystem or a different subsystem). I/O subsystem 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes one or more address translation structures 105 including, for instance, a translation lookaside buffer (TLB) and a segment lookaside buffer (SLB), which, in one embodiment, are located in the MMU. In a further embodiment, the address translation structures 105 also include an effective to real address translation (ERAT) structure, which is, e.g., located in the processor outside the MMU.

Figure 2:
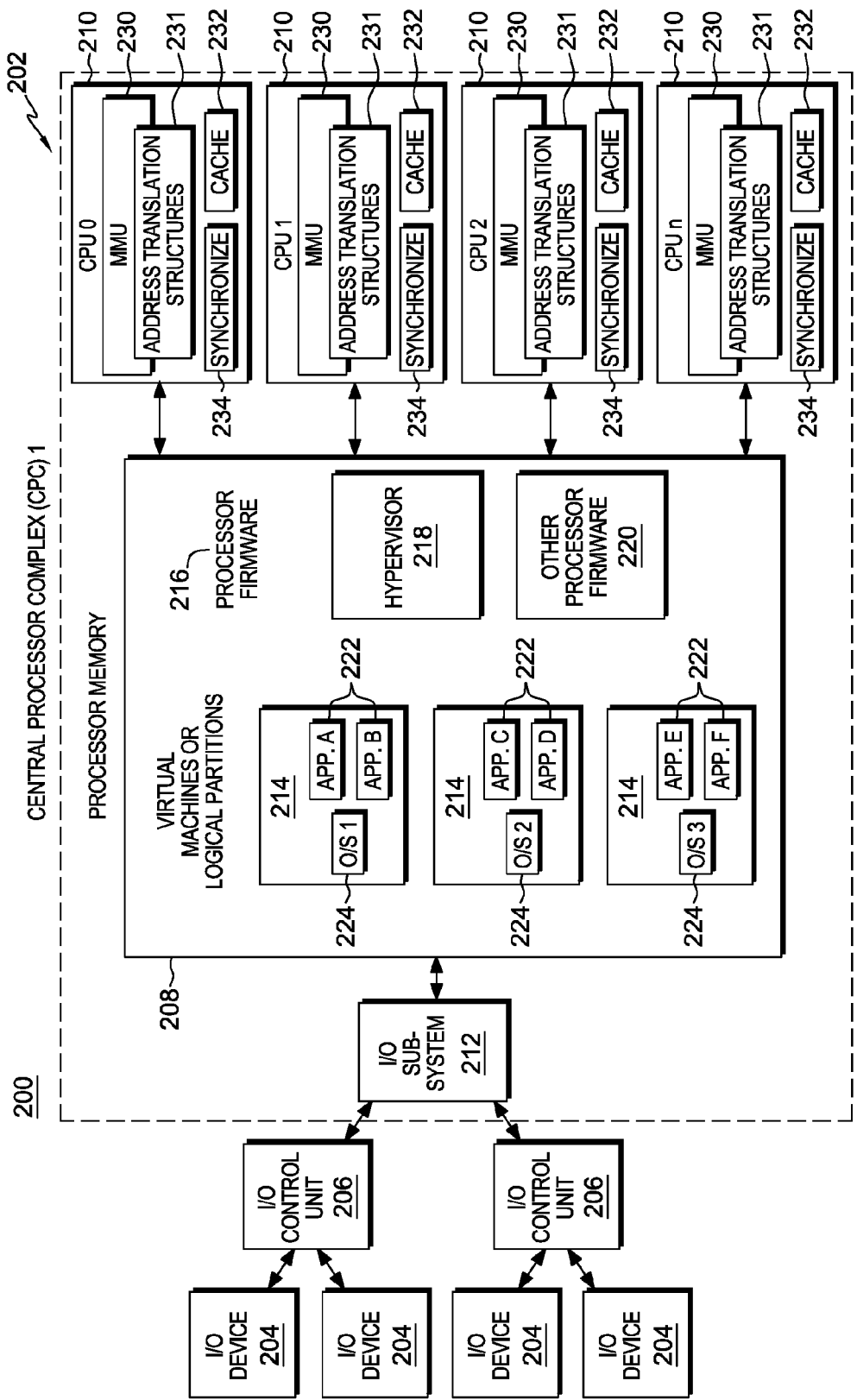
FIG. 2 depicts another example of a computing environment to incorporate and use one or more aspects of a synchronization capability.

A further embodiment of a computing environment to incorporate and use one or more aspects of a synchronization capability is depicted in FIG. 2. Referring to FIG. 2, in one example, a computing environment 200 includes a central processor complex (CPC) 202 coupled to one or more input/output (I/O) devices 204 via one or more control units 206. Central processor complex 202 includes processor memory 208 (a.k.a., main memory, main storage, central storage) coupled to one or more central processors (a.k.a., central processing units (CPUs)) 210 and an I/O subsystem 212, each of which is further described below.

Processor memory 208 includes one or more virtual machines 214 (for one example of the PowerPC architecture) or one or more logical partitions 214 (for one example of the z/Architecture), and processor firmware 216, which includes a hypervisor 218 and other processor firmware 220. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each virtual machine or logical partition 214 functions as a separate system and has one or more applications 222, and optionally, a resident operating system 224 therein, which may differ for each virtual machine or logical partition. In one embodiment, the operating system is the z/VM operating system, the z/OS operating system, the z/Linux operating system, the TPF operating system, the AIX operating system, the Power Linux operating system, the IBM i/OS operating system, or another operating system offered by International Business Machines Corporation, Armonk, N.Y.; or another operating system offered by another company. The virtual machines are managed by hypervisor 218, such as PowerVM, offered by International Business Machines Corporation, Armonk, N.Y.; and the logical partitions are managed by hypervisor 218, such as the Processor Resource/System Manager (PRISM), offered by International Business Machines Corporation, Armonk, N.Y.

Central processors 210 are physical processor resources assignable to the virtual machines or allocated to the logical partitions. For instance, each virtual machine or logical partition 214 includes one or more logical processors, each of which represents all or a share of one or more physical processors 210 that may be dynamically allocated to the virtual machine or partition. A central processor may include a memory management unit (MMU) 230, one or more address translation structures 231, at least one cache 232, and a synchronization unit 234 used to provide the synchronization capability described herein.

Input/output subsystem 212 directs the flow of information between input/output devices 204 and main memory 208. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. Further, the I/O subsystem uses one or more input/output paths as communication links in managing the flow of information to or from input/output devices 204.

Figure 3A:
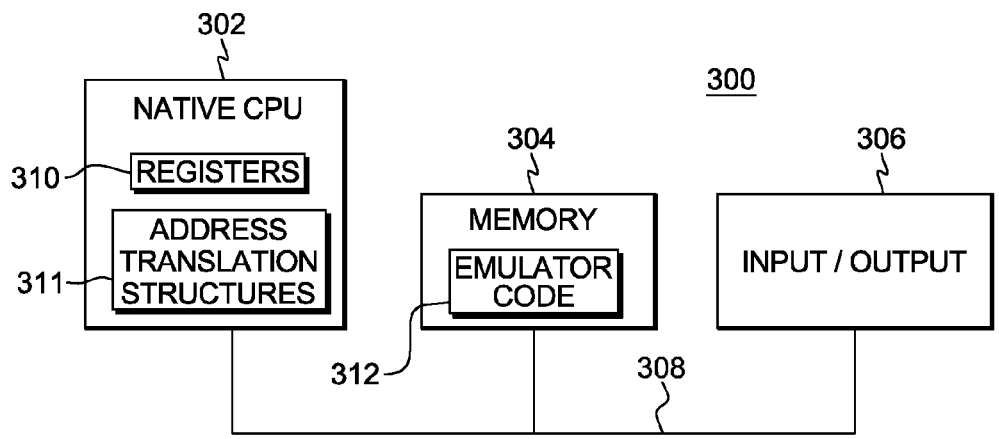
FIG. 3A depicts yet another example of a computing environment to incorporate and use one or more aspects of a synchronization capability.

Another embodiment of a computing environment to incorporate and use one or more aspects of the synchronization capability is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment, as well as one or more address translation structures 311. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture, or allows machines based on architectures other than the Power Architecture, such as HP Superdome Servers or others, to emulate the Power Architecture and to execute software and instructions developed based on the Power Architecture.

Figure 3B:
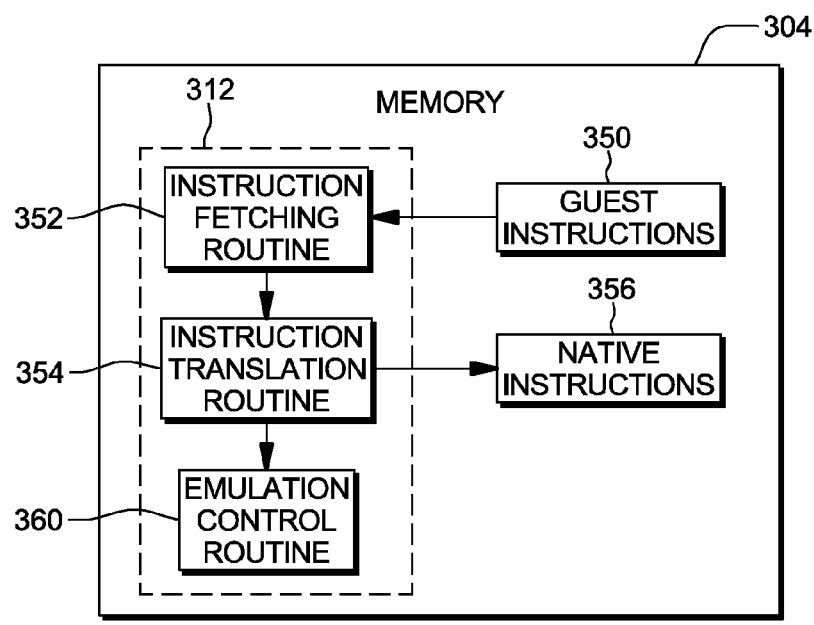
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a Power Architecture or z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

In implementations, the synchronization capability described herein may be provided by the CPUs that are performing the emulation, or may be provided by the emulated software. Various implementations are possible.

The computing environments described above are only examples of computing environments that can be used. Other environments, including but not limited to, other environments with multiple processors, other partitioned environments, and/or other emulated environments, may be used; embodiments are not limited to any one environment.

Each of the computing environments, however, uses aspects of virtual addressing, including data structures referred to as page tables. As is known, physical memory is of a defined size and in order to have the physical memory appear larger than it is, virtual memory is utilized. Virtual memory is mapped to real memory via, for instance, a hash page table (HPT) technique to locate page table entries (PTEs). Each segment of the virtual memory is mapped to a segment ID (SID) entry identified by an effective segment ID (ESID). An effective address used by the program includes, for instance, an ESID, a page portion and a byte portion, and is used to select an SID entry, which includes the ESID value, as well as a virtual segment ID (VSID) value. The VSID value represents the high-order bits of a virtual address to be used by a hashing algorithm to search the hash page table. A hashed value based on the VSID is used to locate a page table entry (PTE). The page table entry includes an address of a page of physical memory. In order to improve performance, once a PTE is found, the page portion of the effective address and the address of the physical memory page found in the PTE are stored in a cache structure, such as a translation lookaside buffer (TLB), such that further accesses to the same effective address page will "hit" in the TLB and avoid the PTE search. In other embodiments, other cache structures may be used instead of or in addition to the TLB to store page table entries, including but not limited to, an effective to real address translation (ERAT) structure.

Further details associated with a page table entry are described with reference to FIG. 4. Each page table entry 400 maps one virtual number to one real page number. As an example for the Power ISA architecture, a page table entry includes the following:

| Dword | Bit(s) | Name | Description |
|---|---|---|---|
| 0 | 0:1 | B (402) | Segment Size<br>0b00 - 256 MB; 0b01 - 1 TB;<br>0b10 - 256 TB; 0b11 - reserved |
| | 2:56 | AVA (404) | Abbreviated Virtual Address |
| | 57:60 | SW (406) | Available for software use |
| | 61 | L (408) | Virtual page size<br>0b0 - 4 KB<br>0b1 - greater than 4 KB (large page) |
| | 62 | H (410) | Hash function identifier |
| | 63 | V (412) | Entry valid (V = 1) or invalid (V = 0) |
| 1 | 0 | PP (414) | Page Protection bit 0 |
| | 2:3 | Key (418) | KEY bits 0:1 |
| | 4:43 | ARPN (420) | Abbreviated Real Page Number |
| | 44:51 | LP (422) | Large page size selector |
| | 52:54 | Key (424) | KEY bits 2:4 |
| | 55 | R (426) | Reference bit |
| | 56 | C (428) | Change bit |
| | 57:60 | WIMG (429) | Storage control bits |

-continued

| Dword | Bit(s) | Name | Description |
|---|---|---|---|
| | 61 | N (430) | No-execute page if N = 1 |
| | 62:63 | PP (432) | Page Protection bits 1:2 |

The ARPN concatenated with LP $((ARPN\|LP)_{0:59-P})$ provides a first portion 442 of a real address 440 and a byte portion 444 from the effective address provides a second portion of the real address.

Further details regarding one implementation of page tables and page table entries are described in Power ISA™ Version 2.07 specification, May 3, 2013, offered by International Business Machines Corporation and incorporated herein by reference in its entirety.

The use of a hash page table to translate addresses is only one example of a translation technique. Other address translation schemes, including those that use a hierarchy of translation tables, are described in the following publications: z/Architecture—Principles of Operation, Publication No. SA22-7932-09, 10th Edition, September 2012, and Intel Itanium Architecture Software Developer's Manual Volume 2: System Architecture, Document Number: 245318, May 2010, each hereby incorporated herein by reference in its entirety. In one example, for the z/Architecture, the hierarchy of tables is referred to as dynamic address translation (DAT) tables; and for Power ISA, the tables are referred to as radix tables.

As described herein, a synchronization capability is provided to synchronize updates to page table entries. One example of a synchronization instruction, referred to herein as RCsync, that may be used is described with reference to FIG. 5. In one implementation, an RCsync instruction 500 includes an operation code 502a, 502b indicating a synchronization operation; an L field 504 used to indicate a type of synchronization operation (e.g., L=3 indicates an RCsync operation); and an element barrier (E) field 506, which in this embodiment is 0. In other embodiments, the RCsync instruction has its own opcode, rather than having a general opcode that is used for a variety of sync operations and specifying RCsync by the L field. Many variations are possible.

One embodiment of synchronization logic using, for instance, RCsync is described with reference to FIG. 6. In one embodiment, a plurality of processors are performing this logic, including a local processor, which is the processor initiating the synchronization process, and one or more remote processors that are performing processing responsive to initiation of the synchronization process.

Figure 6:
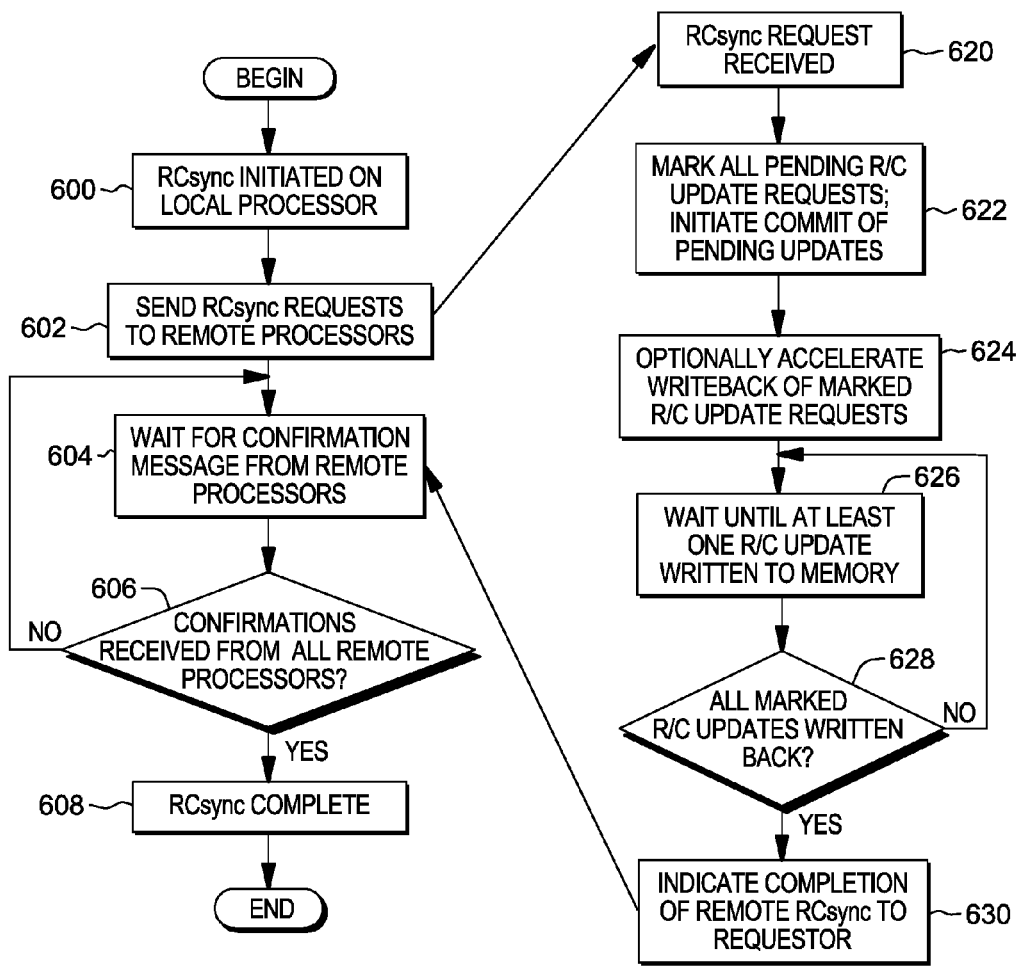
FIG. 6 depicts one embodiment of synchronization logic.

Referring to FIG. 6, initially, a local processor initiates an RCsync instruction, STEP 600, which broadcasts an RCsync request to one or more remote processors, STEP 602. In embodiments, the RCsync request is broadcast to all processors in a same logical partition (LPAR), virtual machine (VM) or other group; to processors using the same address space; or to all processors of a configuration, as examples. In one particular example, if the broadcast is sent to all processors, it is sent with an LPAR id, VM id or other identifier, and if the processor receiving the request is not part of the LPAR, VM or other group, then it immediately confirms completion.

Subsequent to broadcasting the requests, the local processor waits for confirmation from the remote processors that they completed RCsync processing, STEP 604. In an alternative embodiment, the local processor checks whether it has received confirmation either continually or at predefined intervals. If it has not received confirmation from the remote processors to which the request was broadcast, INQUIRY 606, then it continues to wait, STEP 604. Otherwise, synchronization is complete, which means that the in-memory page table entries have been updated to reflect changes (e.g., updated R/C indicators) in cached entries (e.g., TLBs), STEP 608.

On each remote processor, the RCsync request is received from the local processor, STEP 620, and all pending reference and change (R/C) update requests are marked, STEP 622. For instance, as a reference and/or change update occurs in the cache (e.g., the TLB), the pending update is placed on a store queue for an eventual write to memory. (In further embodiments, the pending R/C updates are stored in a separate R/C update queue.) Thus, when an RCsync request is received, each update that came before the RCsync request is marked in the queue, and commitment of the pending address translation cache updates to memory is initiated. Further, in one embodiment, an optional step is performed, in which an accelerated writeback of the marked R/C update requests is processed, STEP 624.

In a further embodiment, responsive to receiving the RCsync request and prior to performing the marking, if there is no queue of pending updates, one is created; and/or processing may be performed to ensure the queue is up-to-date.

The remote processor then waits until at least one R/C update of the store queue is written to memory (e.g., the PTE), STEP 626. In an alternate implementation, the remote processor may constantly check whether the update is written to memory or check at predefined intervals. After at least one R/C update is written to memory, the remote processor checks whether all marked updates are written to memory, INQUIRY 628. If all marked R/C updates are not written to memory, INQUIRY 628, then the processor continues to wait, STEP 626. Otherwise, completion of the remote RCsync is indicated to the requestor; i.e., the local processor, STEP 630.

In one alternate embodiment, the technique may determine the number of R/C update entries in a store or other queue in STEP 622, and waits for the number of counted entries to be processed in STEP 626.

In yet another alternate embodiment, generation of additional memory requests to a store or other queue is optionally halted in STEP 622, and the processor waits until the store or other queue is empty in STEP 626 prior to indicating completion of an RCsync request.

In addition to the above, in one embodiment, the local processor also performs synchronization locally ensuring that any changes in a locally cached page table (e.g., local TLB) are written out to memory (e.g., to the in-memory copy of the PTE).

Another embodiment of synchronization logic using, for instance, RCsync is described with reference to FIG. 7. In one embodiment, a plurality of processors are performing this logic, including a local processor, which is the processor initiating the synchronization process, and one or more remote processors that are performing processing responsive to initiation of the synchronization process.

Figure 7:
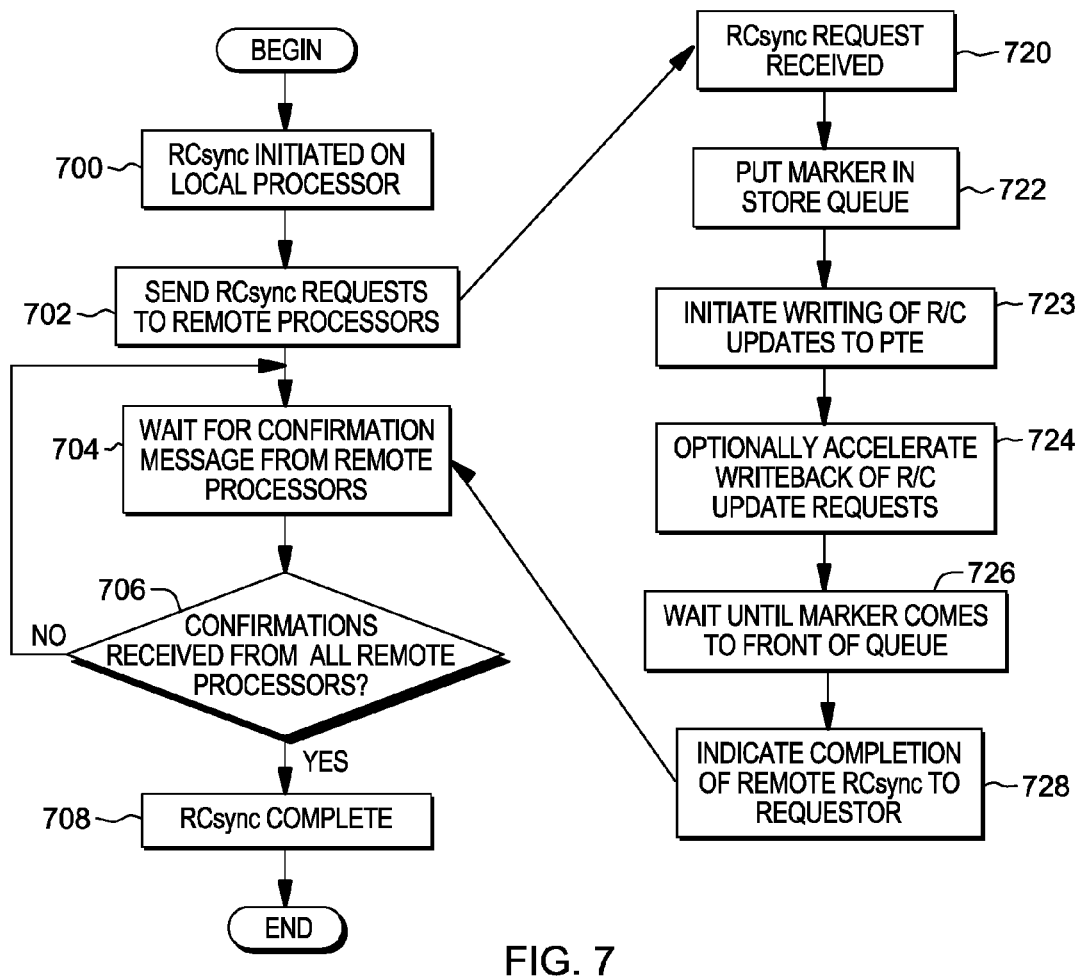
FIG. 7 depicts another embodiment of synchronization logic.

Referring to FIG. 7, initially, a local processor initiates an RCsync instruction, STEP 700, which broadcasts an RCsync request to one or more remote processors (e.g., all of the remote processors in the system or a subset thereof), STEP 702. The local processor then waits for confirmation from the remote processors that they completed RCsync processing, STEP 704. In an alternative embodiment, the local processor checks whether it has received confirmation either continually or at predefined intervals. If it has not received confirmation from all the remote processors to which it broadcast the request, INQUIRY 706, then it continues to wait, STEP 704. Otherwise, synchronization is complete, STEP 708.

On each remote processor, the RCsync request is received from the local processor, STEP 720, and instead of marking each in-flight R/C update request in the store queue, a marker is placed in the store queue, and then assuming the queue is processed in order, when the marker comes to the head of the queue, it knows all of the updates that came before the RCsync was received were processed, STEP 722.

The queue is processed by initiating the writing of the R/C updates to the page table, STEP 723. Further, in one embodiment, an optional step is performed, in which an accelerated writeback of the R/C update requests is processed, STEP 724.

In a further embodiment, responsive to receiving the RCsync request and prior to performing the marking, if there is no queue of pending updates, one is created; and/or processing may be performed to ensure the queue is up-to-date.

The remote processor then waits until the marker comes to the front or head of the queue, STEP 726. Based on the marker coming to the head of the queue, the remote processor indicates to the requestor (i.e., local processor) completion of the remote RCsync, STEP 728.

In one alternate embodiment, the technique may determine the number of entries in a store or other queue in STEP 722, and waits for the number of counted entries to be processed in STEP 726.

In yet another alternate embodiment, generation of additional memory requests to a store or other queue is optionally halted in STEP 722, and the processor waits until the store or other queue is empty in STEP 726 prior to indicating completion of an RCsync request.

Again, in addition to the above, in one embodiment, the local processor also performs synchronization locally ensuring that any changes in a locally cached page table (e.g., local TLB) are written out to memory (e.g., to the in-memory copy of the PTE).

In one aspect, RCsync ensures that the remote reference and change (R/C) updates that are pending have been completed on all the remote nodes determined to receive the RCsync request. In one implementation, when RCsync is issued, the R/C updates corresponding to a state of memory prior to the RCsync have been completed. After completion of RCsync, for each page table entry, only page table entry updates are possible that reflect the value of the page table entry at the time at or after the RCsync. Thus, if a page table entry was set to read-only prior to RCsync, but was previously write-enabled, RCsync forces any C indicator settings in the page table entry, and no further changes to the C indicator are made after completion of RCsync, since the new PTE value prohibits it. However, if the C indicator is set in a TLB indicating a write has occurred, future writes using the TLB are possible until the TLB is invalidated or updated. Similarly, if a PTE is set to invalid, no R/C updates occur after the RCsync operation, since the new PTE value prohibits it.

In accordance with existing memory systems, when a cached TLB entry transitions from being cached for allowing reads to allowing writes, the page table entry (or its valid and/or write permissions) are read and updated prior to adding the TLB entry with the write permission. Thus, TLB entries do not trigger C indicator updates once the in-memory PTE entry has been updated to invalid and/or to not have write permissions.

One embodiment of logic associated with a store operation and the use of cached entries in the wake of using RCsync is described with reference to FIG. 8. RCsync may be performed before or after a store operation, and therefore, this logic is used regardless of when RCsync is performed.

Figure 8:
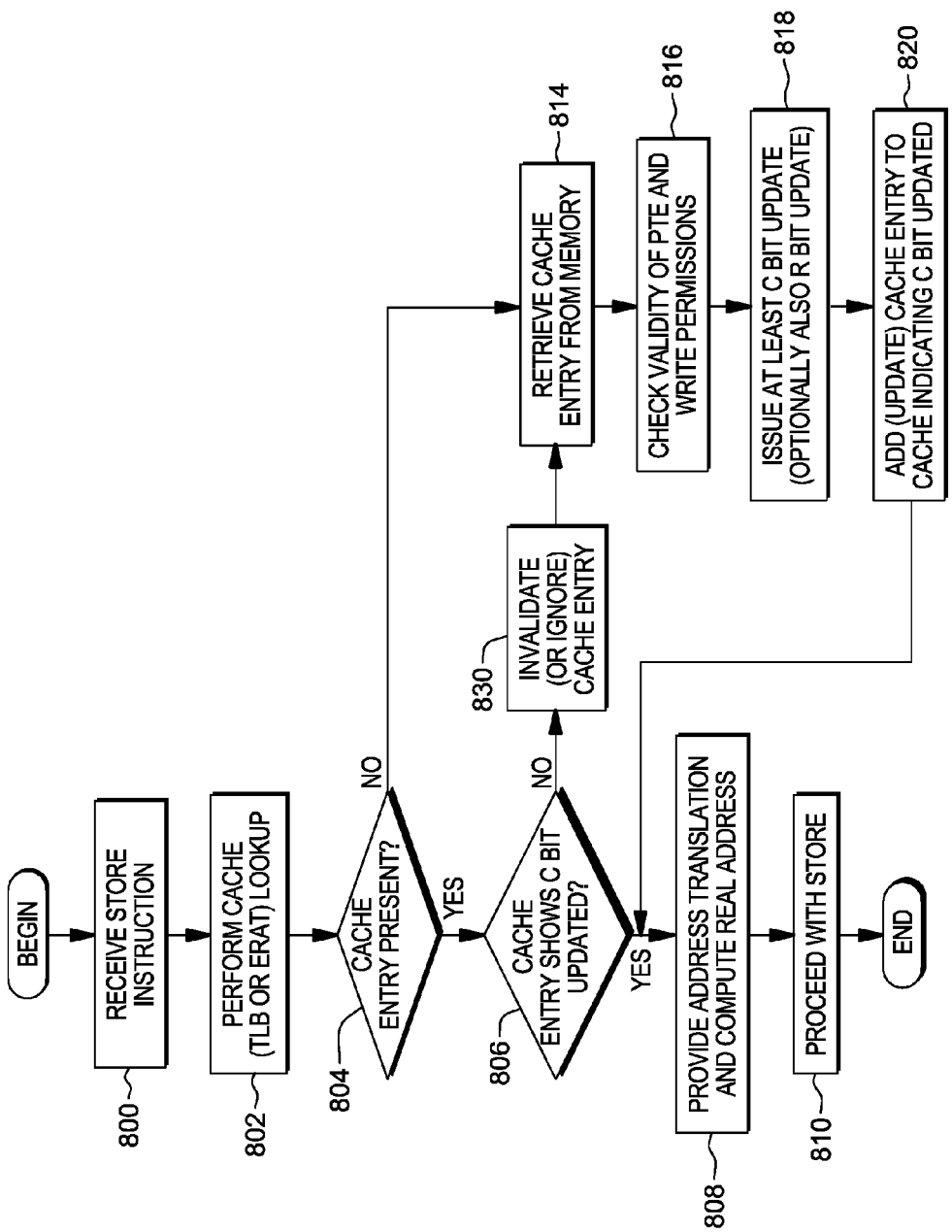
FIG. 8 depicts one embodiment of logic associated with a store operation.

Referring to FIG. 8, initially, a processor receives a store instruction, in which data is to be written to a particular page in memory, STEP 800. Based on receiving the store instruction, the processor performs a lookup in one or more address translation structures, such as a translation lookaside buffer (TLB) or effective address to real address translation structure (ERAT), to determine whether a translation entry corresponding to the page has been cached, STEP 802. If a cache entry, such as a TLB and/or ERAT entry, is present, INQUIRY 804, then a further determination is made as to whether the cache entry shows the change indicator as updated (e.g., C=1) indicating that this page has been written to previously, INQUIRY 806. If it is set (e.g., C=1), then the entry is used in address translation to provide a real address, STEP 808, and processing proceeds with the store, STEP 810.

Returning to INQUIRY 804, if, however, a cache entry is not present, then a cache entry corresponding to the present page translation is created by retrieving at least one relevant page table entry from memory, STEP 814. Thereafter, the validity of the page table entry and the write permissions are checked to obtain the most up-to-date read/write status, STEP 816. Assuming the page table entry is valid and that a write permission has been granted, the change indicator in the cache entry corresponding to the present page translation reflects this, e.g., C=1 (optionally, the reference indicator and/or other indicators are also set in the TLB), STEP 818. In one embodiment, a write update is entered in a store queue to update at least the C bit to indicate that the present page has been modified, i.e., C=1.

The updated cache entry is then added to one or more caches (e.g., TLB and/or ERAT), STEP 820, and processing continues at STEP 808. However, in the above processing, if either the page table entry is invalid or a write permission is not granted, the store does not proceed and, optionally, an error is presented.

Returning to INQUIRY 806, if the cache entry does not show the change indicator as set for a write, then the cache entry is invalidated (e.g., V indicator in the cache entry is set to 0 or the entry is deleted) or ignored, STEP 830, and processing continues with STEP 814.

In addition to the above store processing, other processing may also be performed before or after an RCsync instruction. That is, memory instructions (e.g., load, store, etc) may be issued before or after an RCsync. In one particular example, in implementations that allow the prefetching of cache entries, such as TLB or ERAT entries, logic is performed to check the reference indicator to confirm the validity of a cache entry on first use. In other embodiments, TLB entries are not prefetched prior to their first use to perform a memory address translation corresponding to a memory instruction.

One embodiment of logic to process a memory instruction is described with reference to FIG. 9. In one example, this logic is used if prefetching of cache entries (e.g., TLB entries, ERAT entries, etc.) is allowed without setting the reference indicator (e.g., R=1).

Figure 9:
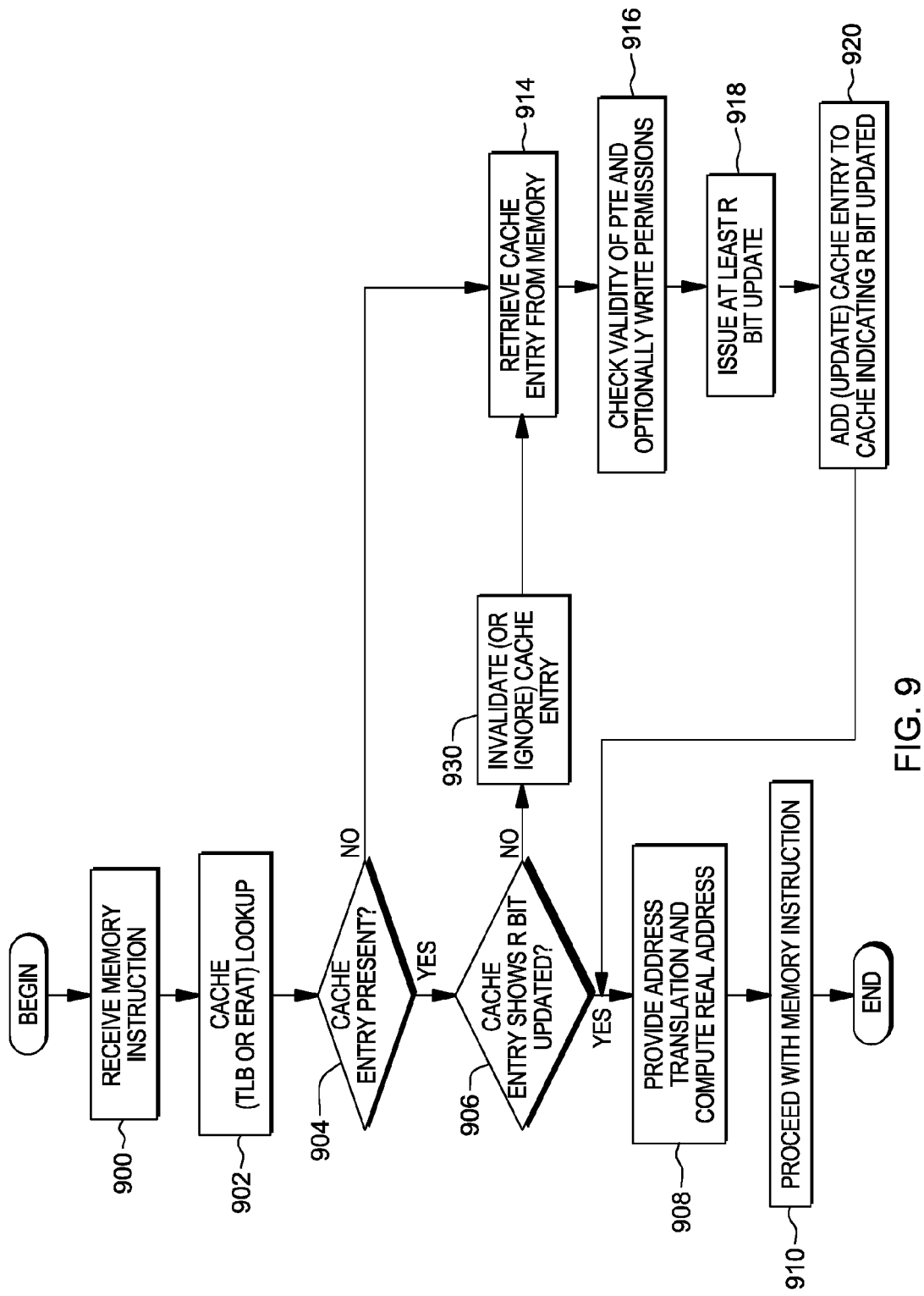
FIG. 9 depicts one embodiment of logic associated with a memory instruction.

Referring to FIG. 9, initially, a processor receives a memory instruction that is to access a selected page of memory, STEP 900. Based on receiving the memory instruction, the processor performs a look-up in a cache, such as a TLB or ERAT, to determine whether an address translation corresponding to the page to be accessed has previously been cached, STEP 902. If an entry corresponding to the page of memory to be accessed is present in the cache, INQUIRY 904, then a further determination is made as to whether the cache entry indicates that the reference indicator is updated (e.g., R=1) indicating that this page has been previously accessed, INQUIRY 906. If it does indicate that the reference indicator is set, then the cache entry is used to perform address translation and to compute a real address to be used for the memory access, STEP 908. Processing then proceeds with the memory instruction, STEP 910.

Returning to INQUIRY 904, if a cache entry is not present, then a cache entry is created by retrieving the relevant page table entry from memory, STEP 914. Thereafter, the validity of the page table entry, and optionally, the write permissions if the memory instruction is a store instruction, are checked to obtain the most up-to-date status, STEP 916. Assuming the page table entry is valid, the reference indicator is updated, e.g., R=1 (and optionally, the change indicator and/or other indicators of the page table entry), STEP 918. In at least one embodiment, a write update is entered in a store queue to update at least the R bit to indicate that the present page has been modified, i.e., R=1. In another embodiment, responsive to a store operation being performed, C=1 may also be updated simultaneously.

The updated cache entry corresponding to the address translation for the present page address is then added to one or more caches (e.g., TLB and/or ERAT) and the reference indicator (and/or optionally, one or more other indicators) is indicated as updated, STEP 920. Processing then continues at STEP 908. However, in the above processing, if the page table entry is invalid, the memory instruction does not proceed and, optionally, an error is presented.

Returning to INQUIRY 906, if the cache entry does not show the reference indicator as set, then the cache entry is invalidated or ignored, STEP 930, and processing continues with STEP 914.

Another embodiment of logic associated with processing a memory instruction is described with reference to FIG. 10. In one example, this logic is used if prefetching of cache entries (e.g., TLB entries, ERAT entries, etc.) is allowed without setting the reference indicator (e.g., R=1).

Figure 10:
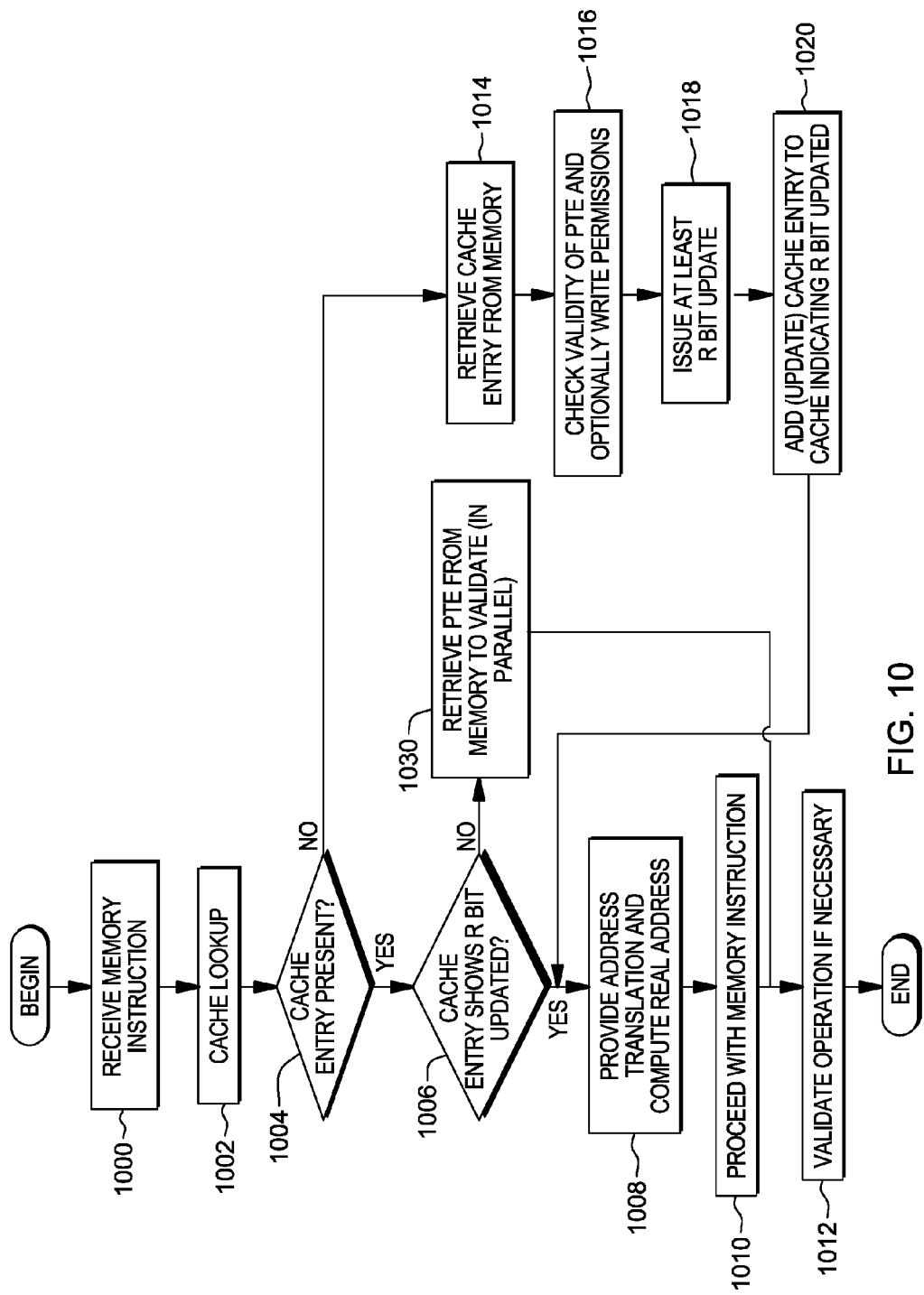
FIG. 10 depicts another embodiment of logic associated with a memory instruction.

Referring to FIG. 10, initially, a processor receives a memory instruction that is to access a selected page of memory, STEP 1000. Based on receiving the memory instruction, the processor performs a look-up in a cache, such as a TLB or ERAT, to determine whether the page to be accessed has previously been cached, STEP 1002. If an entry corresponding to the page of memory to be accessed is present in the cache, INQUIRY 1004, then a further determination is made as to whether the cache entry indicates that the reference indicator is updated (e.g., R=1) indicating that this page has been previously accessed, INQUIRY 1006. If it does indicate that the reference indicator is set, then the cache entry is used to perform address translation and to compute a real address to be used for the memory access, STEP 1008. Processing then proceeds with the memory instruction, STEP 1010. Further, in one embodiment, the operation is validated, if desired, STEP 1012.

Returning to INQUIRY 1004, if a cache entry is not present, then a cache entry is created by retrieving the relevant page table entry from memory, STEP 1014. Thereafter, the validity of the page table entry, and optionally, the write permissions if the memory instruction is a store instruction, are checked to obtain the most up-to-date status, STEP 1016. Assuming the page table entry is valid, the reference indicator is updated, e.g., R=1 (and optionally, the change indicator and/or other indicators of the page table entry), STEP 1018.

The updated cache entry is then added to one or more caches (e.g., TLB and/or ERAT) and the reference indicator (and/or optionally, one or more other indicators) is indicated as updated, STEP 1020. Processing then continues at STEP 1008. However, in the above processing, if the page table entry is invalid, the memory instruction does not proceed and, optionally, an error is presented.

Returning to INQUIRY 1006, if the cache entry does not show the reference indicator as updated, then the page table entry is retrieved from memory to be used in validation, which proceeds in parallel with one or more of STEPs 1008 and 1010, which use a cached entry to perform processing steps in parallel with a concurrent validation of a page entry, STEP 1030. For instance, if the cache entry does not show the reference indicator as updated, the processor initiates a parallel validation (which would subsume STEPs 1014, 1016, 1018, 1020, and in parallel perform STEPs 1008 and 1010. Then, if this was a valid entry, processing should be validated (i.e. the work done in STEPs 1008 and 1010 should be allowed to complete). Processing then continues to STEP 1012, where the operation is validated if the cached entry located in STEP 1002 is enabled.

In accordance with one or more aspects, a processor performs a synchronization operation to force pending updates to page table entries sooner than later. That is, in weakly ordered memory systems, the page table entries may eventually be updated, but there is no guarantee as to the time in which they are updated. Thus, the synchronization processing forces the updates based on receipt of the synchronization instruction. Further, in one implementation, the synchronization is performed without requiring invalidation of individual cache and/or page table entries.

There are many situations in which such a synchronization process may be used, including bulk operations performed on memory pages, such as reconfiguration, managing a free list of memory pages, and performing teardown when a process terminates, as examples. The synchronization is performed to force updates of the page table entries, and thus, providing selectiveness in entries to be, e.g., invalidated (e.g., C=1), rather than invalidating all entries.

Figure 11:
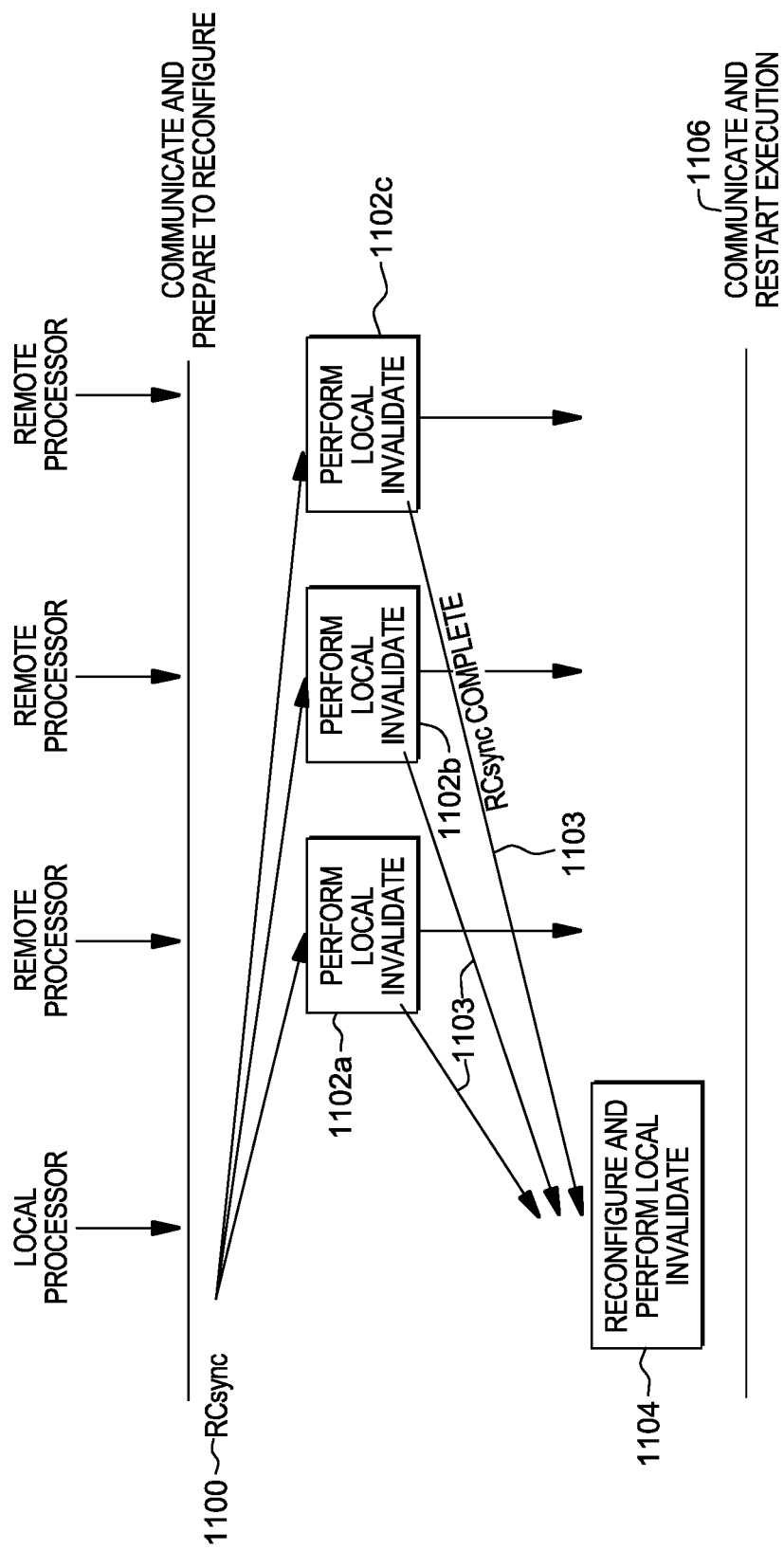
FIG. 11 depicts one example of reconfiguring an address space.

One example situation in which the synchronization operation may be used is in reconfiguring an address space, as described with reference to FIG. 11. Referring to FIG. 11, initially, a local processor issues an RCsync operation to force the updating of page table entries with any pending R/C updates (or other status updates in other examples), STEP 1100. Thereafter, each remote processor that receives the RCsync request from a local processor performing an RCsync instruction performs a synchronization operation, as described herein. In parallel to an ongoing RCsync operation, STEP 1100, a local processor requests each remote processor to perform bulk invalidation of a plurality of page table entries in one or more caches corresponding to the remote processor using, for instance, a TLBIEL instruction or a local IPTE instruction (e.g., an IPTE instruction when the local TLB clearing facility is installed and the LC bit in the $M_4$ field is one), STEPs 1102a-1102c. As examples, the invalidating of an entry includes setting a valid indicator in the entry to a particular value (e.g., V=0); deleting an entry; or otherwise making the entry unavailable; etc.

Subsequent to completing the remote RCsync operation requested by the local processor, each remote processor sends an indication, STEP 1103, to the local processor indicating completion of the RCsync operation, regardless of whether the local invalidate on the respective remote processor is complete. Based on the local processor receiving an indication that the remote processors have completed the RCsync synchronization operation, the local processor proceeds with reconfiguring the address space by updating one or more page table entries in memory to reflect the state of a reconfigured address space and performing a local invalidation operation on the processor's cache entries, STEP 1104, to ensure that no C=stale cache entries corresponding to the address space prior to reconfiguration are stored on the local processor. When remote processors complete invalidation, remote processors wait for address reconfiguration to complete, e.g., via STEP 1106. Thereafter, execution may be restarted on the local and remote processors, STEP 1106. By performing RCsync, in one embodiment, the local processor need not wait until the local invalidations on the remote processors have completed, but instead, may proceed in parallel after receiving an indication that the remote processors completed the RCsync synchronization processing, and hence page table entries stored in memory contain the most current state of R and C status indicators, as well as optionally other information contained in a PTE that is updated by remote processors and may be synchronized with an RCsync, in accordance with one or more aspects.

In one particular example, a synchronization operation may be used to reconfigure an address space to correspond to a read-only address space. In accordance with one embodiment, the pages that have been written to are known, so that they can be tracked, written to disk, etc. As specific examples, an address space is made read-only for techniques, such as partition migration, and use of copy-on-write techniques. Copy-on-write is used, for instance, for a fork( ) operation in Unix operating systems, as well as for other operations. In one such embodiment, copy-on-write is used to copy a large memory region without incurring a long initial latency associated with duplicating all memory pages corresponding to such a region. For instance, with a copy-on-write technique, an entire memory, as one example, is made read-only allowing a plurality of processes to share the memory pages. Then, when a particular process wishes to write to a particular page of its copy of the memory space, the system functions implementing copy-on-write copy that page and make it writable, prior to allowing the process to proceed to write to such a page.

Figure 12:
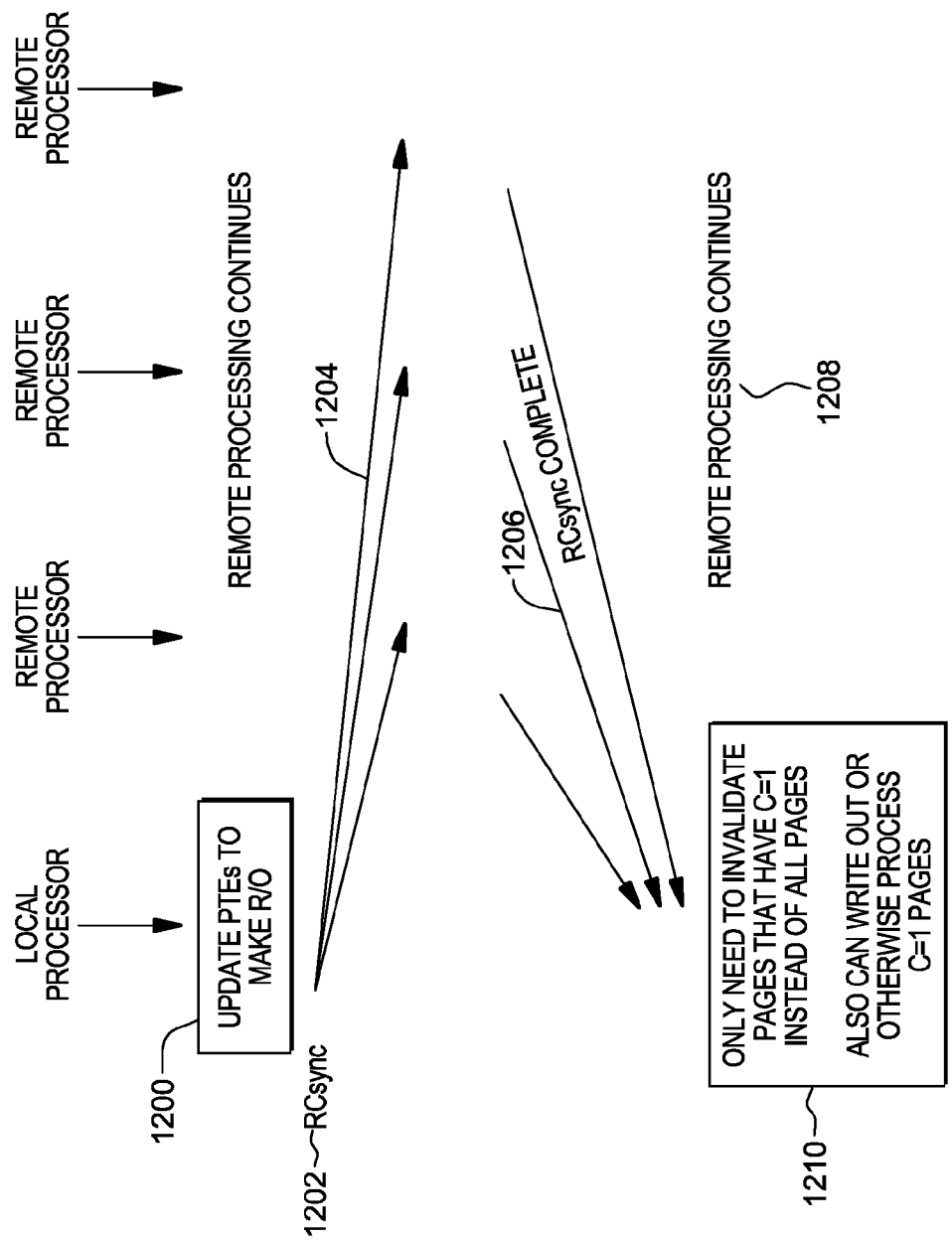
FIG. 12 depicts one embodiment of making pages read-only.

One embodiment of the logic to make pages read-only is described with reference to FIG. 12. In one example, the local processor (i.e., the one that wants to make the address space read-only) updates the page table entries corresponding to the memory pages to be made read-only to indicate read-only (e.g., set the page protection bits of FIG. 4 marked pp, i.e., bits 0, 62 and 63 of the second doubleword of a page table entry, to disallow writes to a subject page), STEP 1200, and then executes a synchronization operation, such as RCsync, to synchronize (e.g., force out) all the reference and change indicators for which updates may be in-flight up to the point of issuing the RCsync operation, STEP 1202.

The remote processors receive the RCsync operation, process it, as described above, STEP 1204, and indicate completion, STEP 1206. Other remote processing also continues, STEP 1208.

The local processor receives the completion indications, and after the synchronization operation is completed by the remote processors, the local processor has an accurate list of the remotely stored-into pages (e.g., those with C=1). Further, the remote processors cannot use new pages for a store operation because the page table entries were set to read-only, and thus, fail the change indicator checking technique described, for instance, in FIG. 8.

The local processor now invalidates the address translation cache entries corresponding to page table entries that have a set change indicator (e.g., C=1), STEP 1210. For instance, the local processor invalidates its own local entries and broadcasts an indication to the remote processors instructing the remote processors to invalidate their own cached entries. These cached page table entries correspond to all pages that may still be write-updated by remote processors after the update in STEP 1200 (since attempts to store into other pages will fail the technique of FIG. 8), and represents a smaller set of pages to be invalidated than would have to be invalidated without the presence of accurate R/C information in all page table entries. These cached page table entires may be invalidated using either broadcast global hardware-invalidate instructions, such as TLBIE or IPTE, or a software sequence that includes broadcasting a single bulk invalidate request (e.g., using an inter-processor-interrupt facility) in conjunction with software-coordinated local cache invalidation on each remote processor, e.g., using TLBIEL instructions or local IPTE instructions responsive to a list of pages to be invalidated. Additionally, pages that have a set change indicator are processed, such as writing the pages to disk, etc.

In another embodiment, a first page table entry update step corresponding to STEP 1200 updates all page tables entries to be invalid prior to performing an RCsync, and a second processing STEP 1210 updates page table entries to read-only, so as to further synchronize simultaneous updates to page table entries being performed by remote processors responsive to an RCsync.

Figure 13:
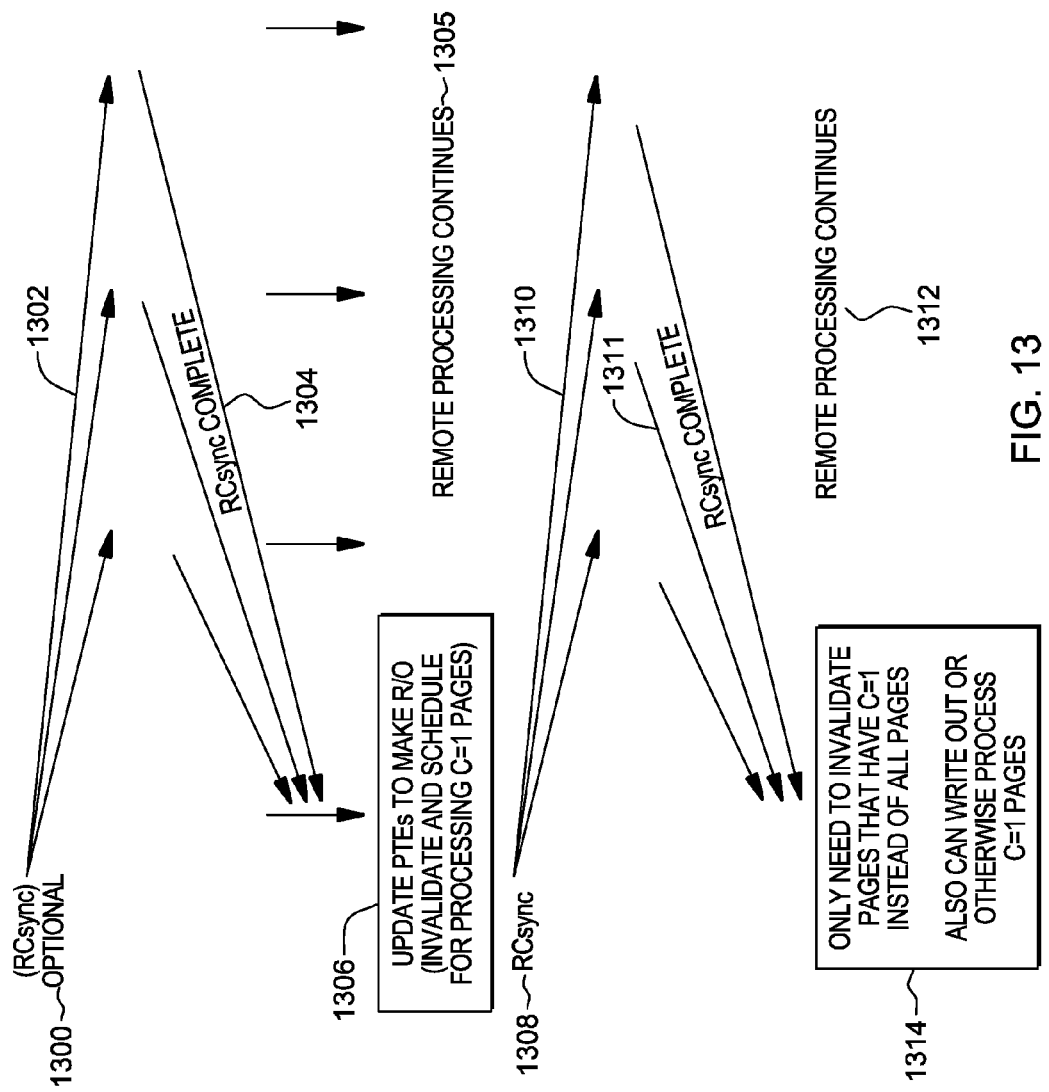
FIG. 13 depicts another embodiment of making pages read-only.

Another embodiment of the logic to make pages read-only is described with reference to FIG. 13. In one example, the local processor (i.e., the one that wants to make the address space read-only) issues a first synchronization operation, such as an RCsync instruction to the remote processors, STEP 1300. The remote processors receive the synchronization operation and process it, as described above, STEP 1302, and then, send indications indicating completion, STEP 1304. Further, processing at the remote processors continues, STEP 1305. (In another embodiment, this first synchronization operation is not performed, as shown in FIG. 12.)

Based on receiving completion indications from the remote processors for the synchronization operation, the local processor updates the page table entries corresponding to the memory pages to be made read-only to indicate read-only, as well as invalidates cache entries that have a set change indicator (e.g., C=1), as described above, and schedules processing for those pages, STEP 1306. In one embodiment of processing of modified pages, modified pages are written to external storage (e.g., such as a hard disk or flash memory). Thereafter, a second synchronization operation, such as RCsync, is issued by the local processor to synchronize (e.g., force out) all remaining page table R and C status updates having occurred since an initial RCsync, STEP 1300, that were in-flight up to the point of issuing the second RCsync operation, STEP 1308.

The remote processors receive the RCsync operation and process it, as described above, STEP 1310, and indicate completion, STEP 1311. Other remote processing also continues, STEP 1312. After the second synchronization operation is completed by the remote processors, the local processor has an accurate list of the remotely stored-into pages (e.g., C=1). Further, the remote processors cannot use new pages for stores because the page table entries were set to read-only, and thus, fail the change indicator checking technique.

The local processor invalidates the cache entries that have a set change indicator (e.g., C=1), as described herein, STEP 1314. In accordance with one or more aspects, this second processing step, STEP 1314, corresponds to a processing of any pages having been modified between the first and the second RCsync. In this embodiment, the majority of updates may be initiated during STEP 1306 and invalidations and other processing (such as I/O operations corresponding to writing modified pages to external storage) may be overlapped with the processing of RCsync, STEP 1308. Additionally, pages that have a set change indicator are processed, such as writing the pages to disk, etc.

Again, invalidations may be performed either by executing TLBIE or IPTE in conjunction with a hardware broadcast of invalidation requests, or by a software synchronized local invalidation being performed on each of the local and remote processors.

In at least one alternate embodiment, STEP 1306 indicates in-memory page table entries to be invalidated by setting a valid indicator to invalid, and a second STEP 1314 updates page table entries to read-only state, e.g., in order to further synchronize page table entry updates.

In other embodiments of making pages read-only, the page table entries may be invalidated first, and then the entries may be marked read-only.

Another use of a synchronization operation is to update a free list of memory pages. In systems that use virtual memory, the operating system is to maintain a free list of memory pages, which is used when a page is to be paged in, a buffer is to be allocated, or a new page is requested by an application, as examples. A goal in maintaining a free list is to place rarely used pages on the free list. Thus, the operating system looks for pages that have R=0 or examines additional reference information for finer-grain processing. In one embodiment, the additional information corresponds to a time stamp of a last reference (e.g., a read or write access to a page), or a bit vector indicating whether a reference has occurred in each of a plurality of time slices, each bit of a bit vector corresponding to one such time slice.

Figure 14:
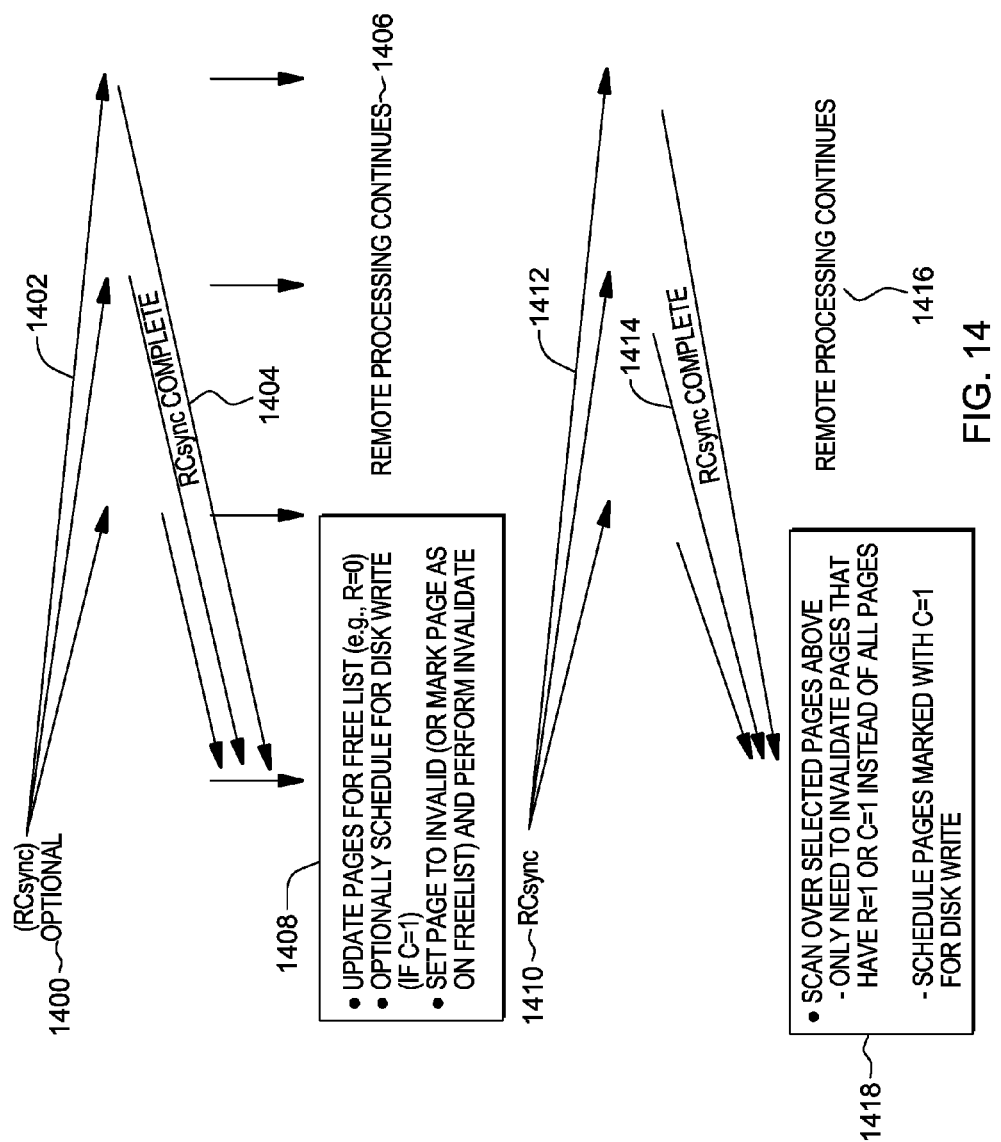
FIG. 14 depicts one embodiment of logic to manage a free list of memory pages.

One embodiment of using a synchronization operation to manage a free list is described with reference to FIG. 14. Initially, a local processor (e.g., the processor that is managing the free list) issues a first synchronization operation, such as RCsync, in order to obtain the most up-to-date information, STEP 1400. The remote processors that receive the synchronization request process it, as described above, STEP 1402, and then indicate completion, STEP 1404. Additionally, remote processing continues, STEP 1406. (In another embodiment, this first synchronization operation is not performed.)

Based on receiving completion indications from all of the remote processors that were to perform the synchronization operation, the local processor performs a number of tasks, STEP 1408. These tasks include, for instance, identifying one or more pages for the free list, such as those pages in which the reference indicator is not set (e.g., R=0); optionally, schedule one or more pages for a disk write, if the change indicator is set (e.g., C=1); set one or more pages in the page table entry to invalid (or mark them as on the free list); and/or perform invalidation for any cache address translation entries corresponding to the pages that need to be invalidated, as described herein (e.g., using IPTE, TLBIE).

Thereafter, the local processor issues a second synchronization operation, such as RCsync, to the remote processors, STEP 1410. The remote processors process the second synchronization operation, STEP 1412, and indicate completion, STEP 1414. Further, other remote processing continues, STEP 1416.

After the synchronization operation is completed by the remote processors that are to perform the synchronization operation, the local processor has an accurate list of the remotely used pages. The local processor now invalidates only the page table entries and/or the cache entries that have a set change or reference indicator (e.g., C=1 or R=1), as described herein, STEP 1418. This is a clean-up for pages that changed from the first synchronization operation to the second synchronization operation. In one embodiment, only pages that are known to have been referenced by one or more processors and to be possibly in one or more translation caches need to be invalidated, thereby reducing the need for page invalidations. Additionally, pages that have a set change indicator are processed, such as writing the pages to disk, etc.

Another example in which synchronization processing is used is in a process teardown, which occurs when a process is terminated. In a process teardown, all of the pages of that process are to be invalidated or placed on a free list, if this process is the only user. Also, in a process teardown, if a page is to be written back, write back processing is initiated.

Figure 15:
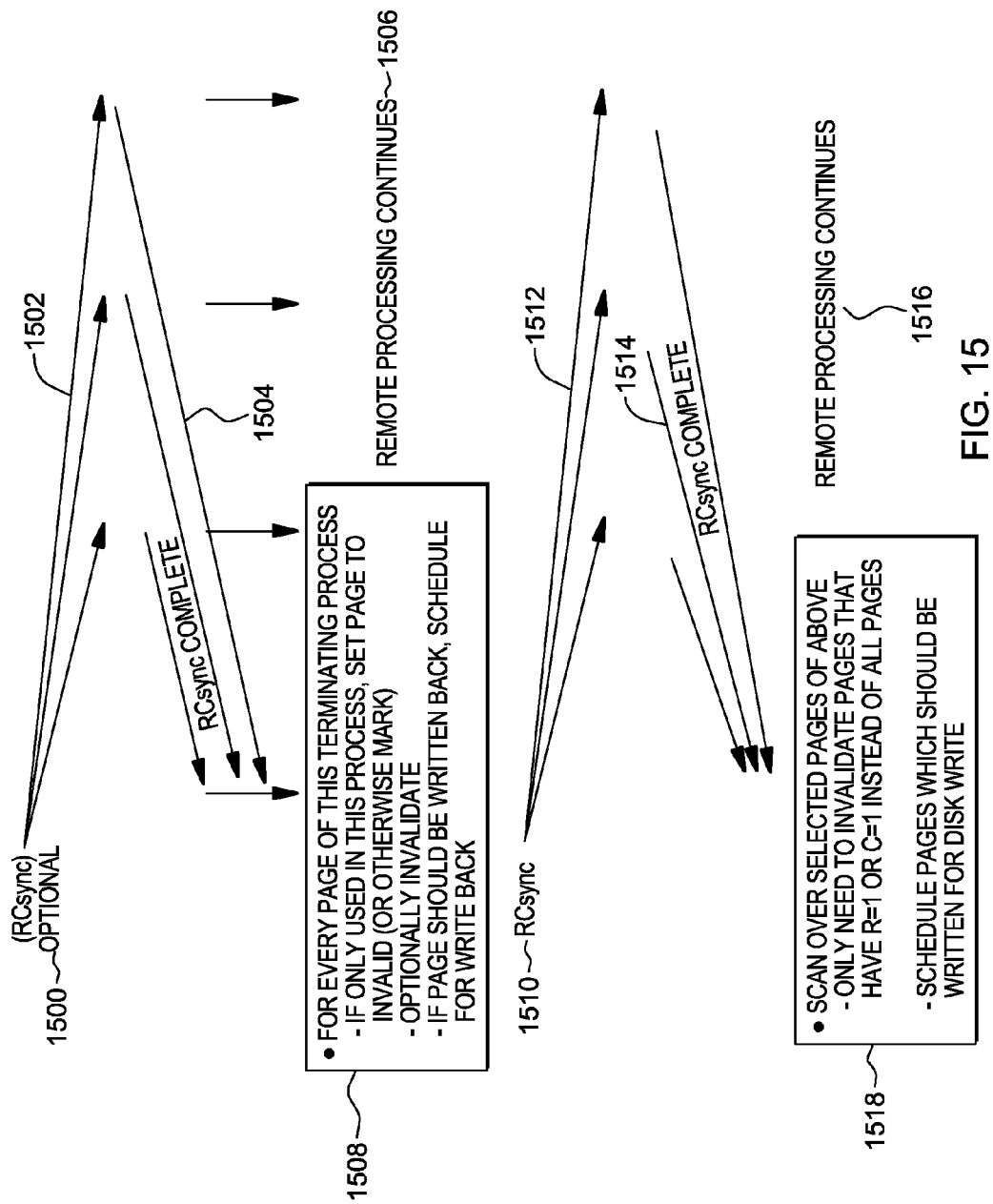
FIG. 15 depicts one embodiment of logic to manage memory based on terminating a process.

One embodiment of using a synchronization operation to perform a process teardown is described with reference to FIG. 15. Initially, a local processor (e.g., the processor that is performing the process teardown) issues a first synchronization operation, such as RCsync, in order to obtain the most up-to-date information, STEP 1500. The remote processors that receive the synchronization request process it, as described above, STEP 1502, and then indicate completion, STEP 1504. Additionally, remote, processing continues, STEP 1506. (In another embodiment, this first synchronization operation is not performed.)

Based on receiving completion indications from all of the remote processors that were to perform the synchronization operation, the local processor performs a number of tasks, STEP 1508. These tasks include, for instance, for each page of the process, if the page is only used in the process, then to set the page to invalid; optionally, perform invalidation of cached address translations for any pages that need to be invalidated, as described herein (e.g., using IPTE, TLBIE); and if a page is to be written back to disk, initiate a write back operation.

Thereafter, the local processor issues a second synchronization operation, such as RCsync, to the remote processors, STEP 1510. The remote processors process the second synchronization operation, STEP 1512, and indicate completion, STEP 1514. Further, other remote processing continues, STEP 1516.

After the synchronization operation is completed by the remote processors that are to perform synchronization, the local processor has an accurate list of the remotely used pages. The local processor now invalidates only the page table entries and/or the cache entries that have a set change or reference indicator (e.g., C=1 or R=1), STEP 1518, as described herein. This is a clean-up for pages that changed from the first synchronization operation to the second synchronization operation. Additionally, pages that have a set change indicator are processed, such as writing the pages to disk, etc.

Described in detail herein is a synchronization capability that may be used by a number of techniques to obtain the most up-to-date status information for page table entries. In one example, a synchronization operation uses an RCsync instruction that ensures all updates to dynamically updated portions of a page table entry that have occurred prior to the execution of RCsync in a multiprocessor system have completed. In one embodiment, a single RCsync ensures all types of updates have completed; and in another embodiment, RCsync offers additional parameters, to specify certain fields (e.g., update C fields, but not R, etc.). Many variations are possible.

In further embodiments, RCsync can be indicated by executing a sequence of instructions, and/or by writing one or more control registers. Other variations are also possible.

In one embodiment, RCsync updates all page table entries that are to be updated based on pending updates in the cache entries identified at the time of receiving RCsync using a single instruction and without invalidating the cache entries (i.e., while allowing cache entries to remain valid).

Current approaches to receive up-to-date R/C indicators require an invalidate (e.g., TLBIE) per PTE. However, in accordance with one or more aspects, a single broadcast can update R/C (and/or other PTE status information) and accelerate processing. For instance, in a single round trip to each remote processor, all R/C updates that are pending prior to performance of the RCsync are committed to memory. This synchronization processing can be used in conjunction with interprocessor interrupt (IPI)-based TLB invalidation that uses single software requests to perform local TLB invalidates.

In accordance with one or more aspects, a synchronization process is provided that enables a computing environment with a weakly ordered memory having deferred R/C updates (i.e., computing environments configured without coherent updates in that updates are not guaranteed in any specific amount of time) to perform, for instance, bulk demotions, invalidations, etc. locally.

Although in a number of examples herein, it is a page table being updated, one or more aspects may apply to other address translation structures. Further, other units of memory, other than pages, may be accessed and/or stored into. The use of pages and page tables are just examples. Further, a page of memory may be any size including 4K, or greater or less than 4K.

Figure 16:
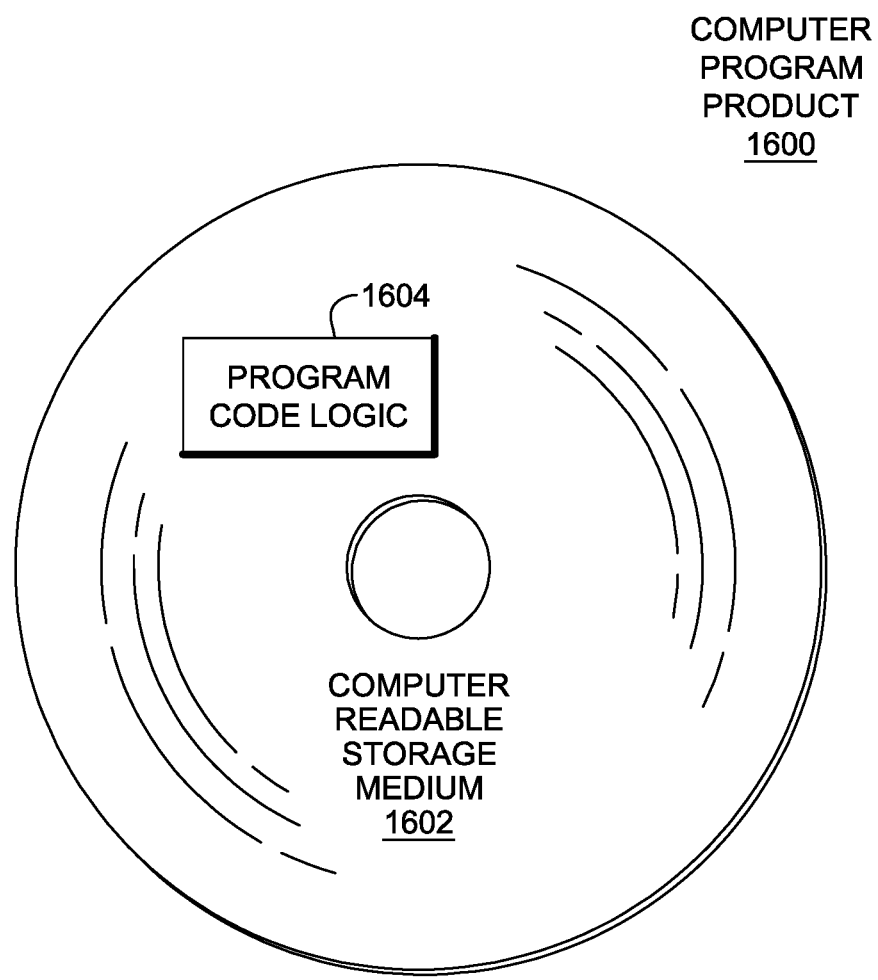
FIG. 16 depicts one embodiment of a computer program product.

Referring to FIG. 16, in one example, a computer program product 1600 includes, for instance, one or more non-transitory computer readable storage media 1602 to store computer readable program code means, logic and/or instructions 1604 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, synchronization may be performed in other ways. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected processors.

Figure 17:
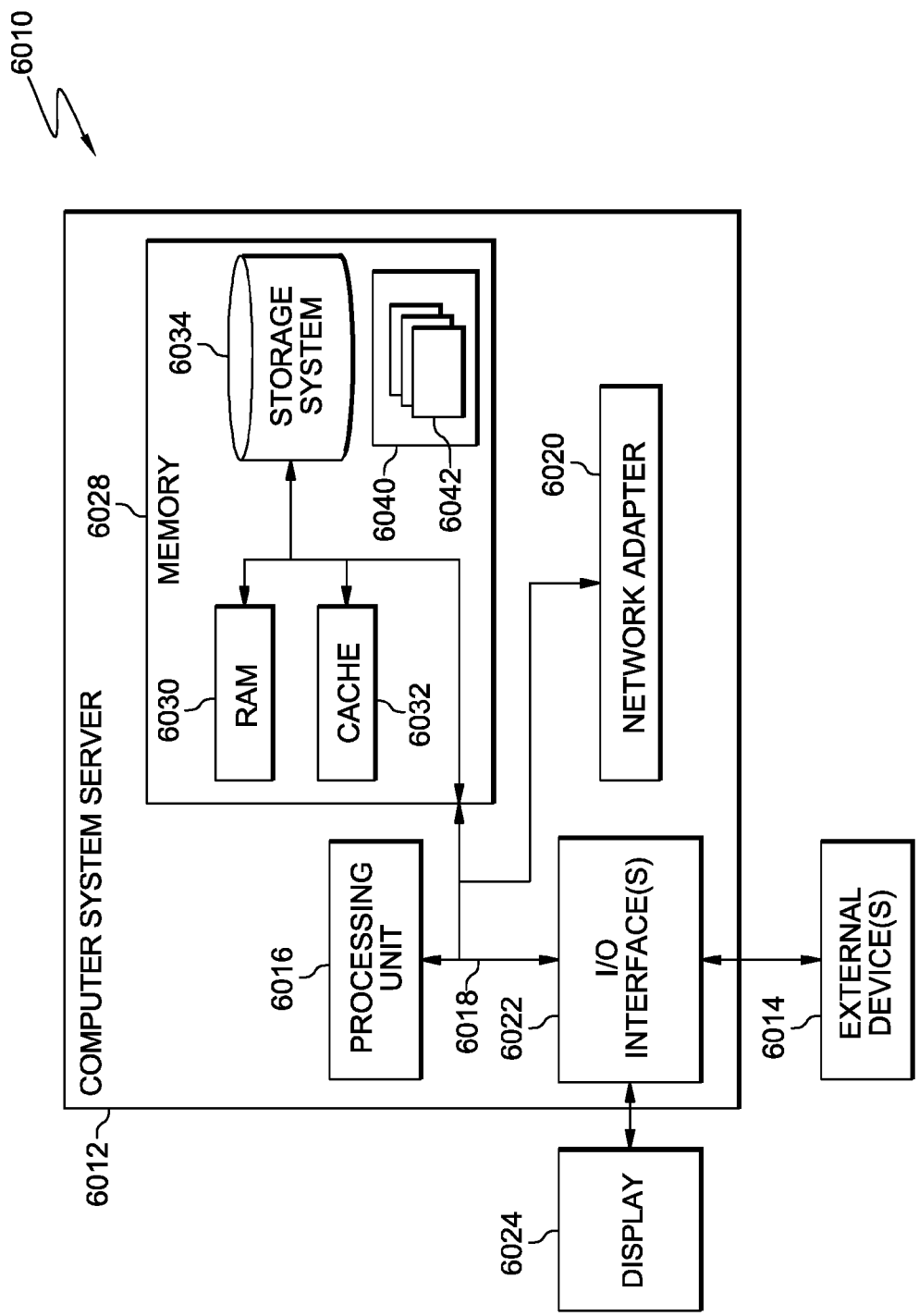
FIG. 17 depicts one embodiment of a cloud computing node.

Referring now to FIG. 17, a schematic of an example of a cloud computing processor is shown. Cloud computing processor 6010 is only one example of a suitable cloud computing processor and is not intended to suggest any limitation as to the scope of use or functionality of embodiments of the invention described herein. Regardless, cloud computing processor 6010 is capable of being implemented and/or performing any of the functionality set forth hereinabove.

In cloud computing processor 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 6012 in cloud computing processor 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 18:
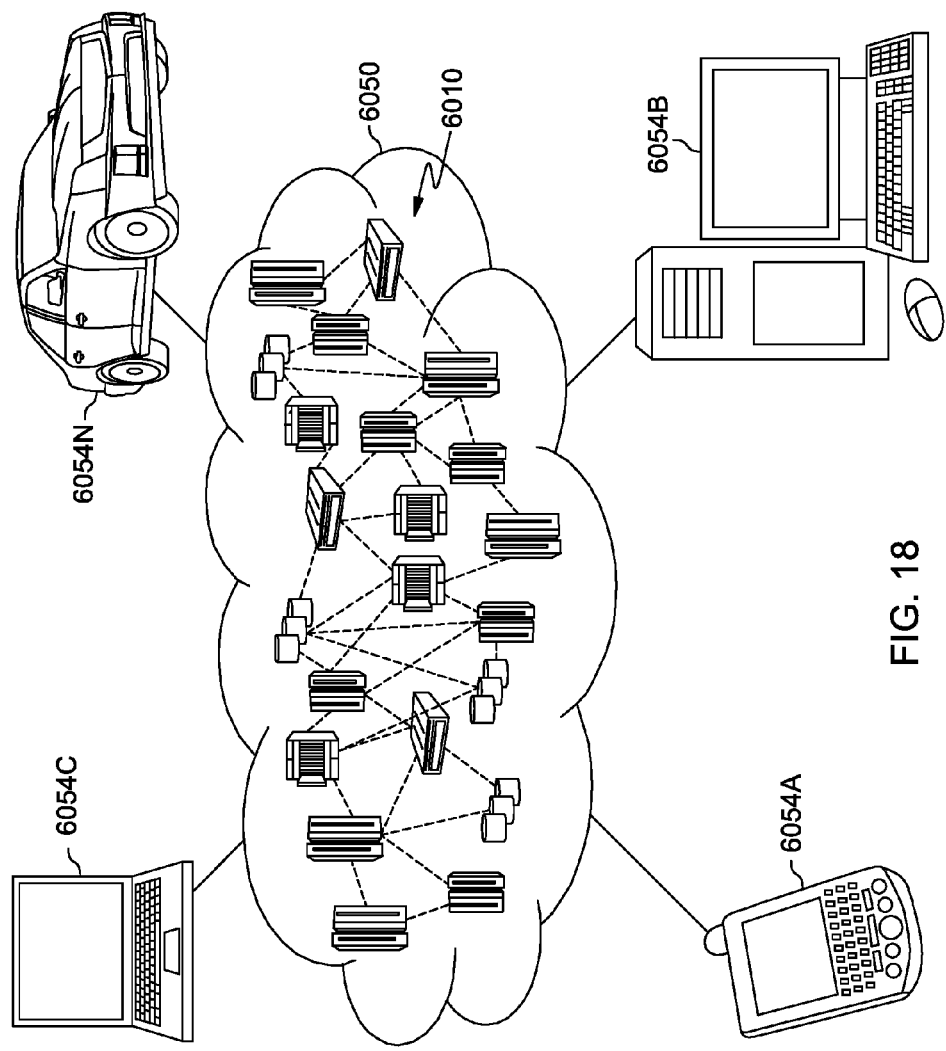
FIG. 18 depicts on embodiment of a cloud computing environment.

Referring now to FIG. 18, illustrative cloud computing environment 6050 is depicted. As shown, cloud computing environment 6050 comprises one or more cloud computing processors 6010 with which local computing devices used by cloud consumers, such as, for example, personal digital assistant (PDA) or cellular telephone 6054A, desktop computer 6054B, laptop computer 6054C, and/or automobile computer system 6054N may communicate. Processors 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 18 are intended to be illustrative only and that computing processors 6010 and cloud computing environment 6050 can communicate with any type of computerized device over any type of network and/or network addressable connection (e.g., using a web browser).

Figure 19:
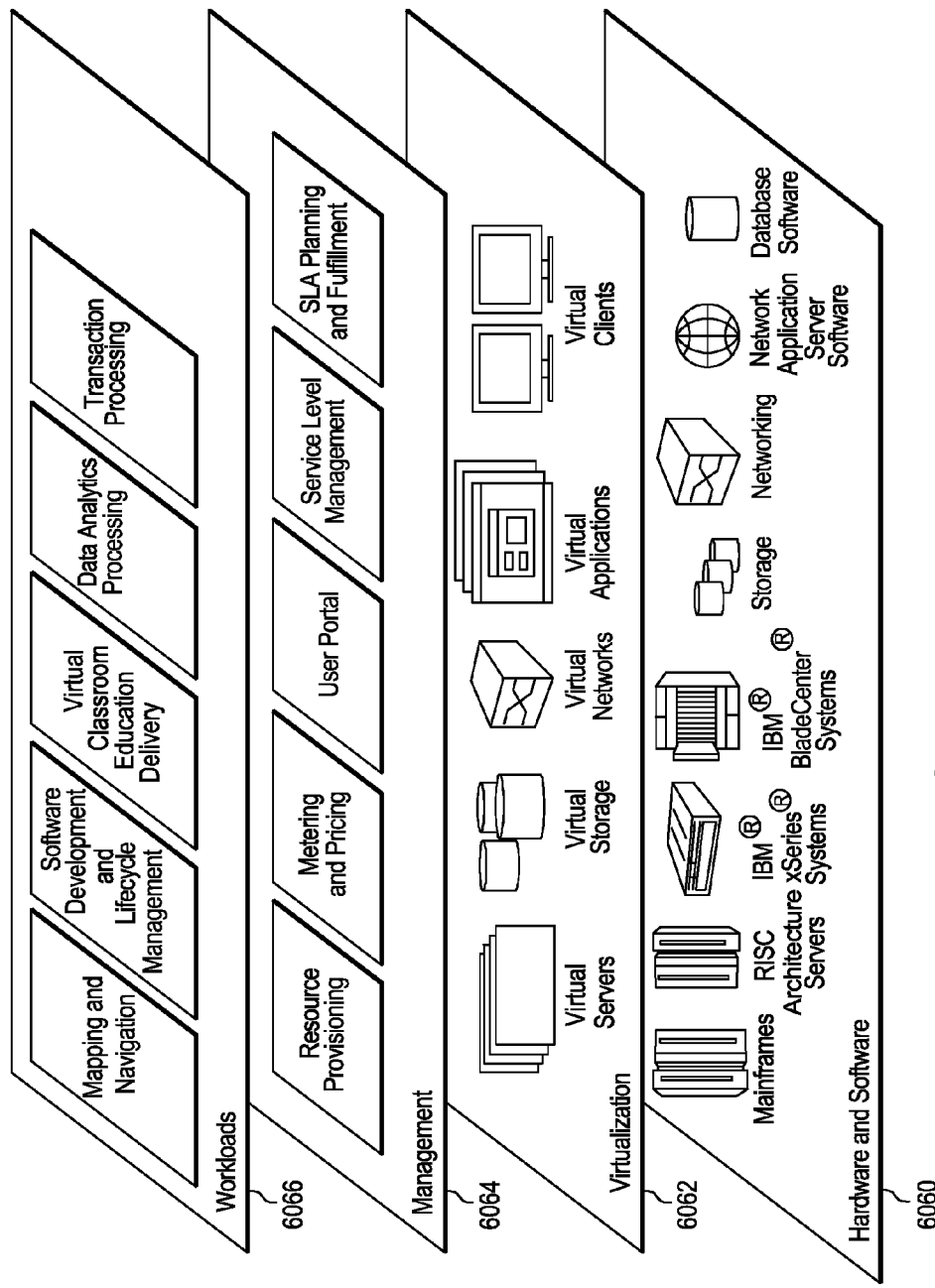
FIG. 19 depicts one example of abstraction model layers.

Referring now to FIG. 19, a set of functional abstraction layers provided by cloud computing environment 6050 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed.

Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for performing operations in a computing environment, said computer program product comprising:
   a computer readable storage medium readable by a processing circuit and storing instructions for execution by the processing circuit for performing a method comprising:
      initiating, by a processor of the computing environment, a synchronization operation to instruct one or more other processors of the computing environment to commit pending updates of one or more status indicators of one or more entries of an address translation structure located in memory;
      receiving, by the processor, a completion indication by the one or more other processors indicating completion of the synchronization operation;
      invalidating, by the processor, based on receipt of the completion indication from the one or more other processors, one or more selected entries of one or more local caches, the one or more selected entries having at least one status indicator that has been updated; and
      based on receiving the completion indication, parallel to the invalidating, performing an operation using one or more entries of the address translation structure.

2. The computer program product of claim 1, wherein the invalidating comprises exclusively invalidating the one or more selected entries.

3. The computer program product of claim 1, wherein the performing the operation comprises providing a free list of a plurality of units of memory.

4. The computer program product of claim 1, wherein the performing the operation comprises managing memory, based on a process terminating.

5. The computer program product of claim 1, wherein the one or more status indicators comprise at least one of a change indicator that indicates whether a unit of memory associated with the change indicator has been updated or a reference indicator that indicates whether the unit of memory associated with the reference indicator has been accessed.

6. The computer program product of claim 5, wherein the unit of memory comprises a page of memory, the address translation structure comprises a page table, and wherein the change indicator and the reference indicator are located in a page table entry corresponding to the page of memory.

7. The computer program product of claim 1, wherein the initiating the synchronization operation comprises issuing a synchronization instruction, the synchronization instruction to send a synchronization request to the one or more other processors.

8. The computer program product of claim 1, wherein the operation is a bulk operation to be performed on a plurality of units of memory.

9. A computer system for performing operations in a computing environment, said computer system comprising:
   a memory; and
   a processor in communication with the memory, wherein the computer system is configured to perform a method, said method comprising:
      initiating, by a processor of the computing environment, a synchronization operation to instruct one or more other processors of the computing environment to commit pending updates of one or more status indicators of one or more entries of an address translation structure located in memory;
      receiving, by the processor, a completion indication by the one or more other processors indicating completion of the synchronization operation;
      invalidating, by the processor, based on receipt of the completion indication from the one or more other processors, one or more selected entries of one or more local caches, the one or more selected entries having at least one status indicator that has been updated; and
      based on receiving the completion indication, parallel to the invalidating, performing an operation using one or more entries of the address translation structure, wherein the method further comprises initiating another synchronization operation prior to the invalidating, and wherein the invalidating is performed based on receiving a completion indication for the other synchronization operation.

10. The computer system of claim 9, wherein the performing the operation comprises providing a free list of a plurality of units of memory.

11. The computer system of claim 9, wherein the performing the operation comprises managing memory, based on a process terminating.

12. The computer system of claim 9, wherein the one or more status indicators comprise at least one of a change indicator that indicates whether a unit of memory associated with the change indicator has been updated or a reference indicator that indicates whether the unit of memory associated with the reference indicator has been accessed.

13. The computer system of claim 9, wherein the invalidating comprises exclusively invalidating the one or more selected entries.

14. The computer system of claim 9, wherein the operation is a bulk operation to be performed on a plurality of units of memory.

15. A computer-implemented method of performing operations in a computing environment, said computer-implemented method comprising:
   initiating, by a processor of the computing environment, a synchronization operation to instruct one or more other processors of the computing environment to commit pending updates of one or more status indicators of one or more entries of an address translation structure located in memory;
   receiving, by the processor, a completion indication by the one or more other processors indicating completion of the synchronization operation;
   invalidating, by the processor, based on receipt of the completion indication from the one or more other processors, one or more selected entries of one or more local caches, the one or more selected entries having at least one status indicator that has been updated; and
   based on receiving the completion indication, parallel to the invalidating, performing an operation using one or more entries of the address translation structure.

16. The computer-implemented method of claim 15, wherein the performing the operation comprises providing a free list of a plurality of units of memory.

17. The computer-implemented method of claim 15, wherein the performing the operation comprises managing memory, based on a process terminating.

18. The computer-implemented method of claim 15, wherein the one or more status indicators comprise at least one of a change indicator that indicates whether a unit of memory associated with the change indicator has been updated or a reference indicator that indicates whether the unit of memory associated with the reference indicator has been accessed.

19. The computer-implemented method of claim 15, wherein the initiating the synchronization operation comprises issuing a synchronization instruction, the synchronization instruction to send a synchronization request to the one or more other processors.

* * * * *